(12) United States Patent
Culver

(10) Patent No.: US 11,814,173 B2
(45) Date of Patent: *Nov. 14, 2023

(54) SYSTEMS AND METHODS FOR UNMANNED AERIAL VEHICLES

(71) Applicant: EZControl LLC, Eau Clare, WI (US)

(72) Inventor: Matthew Culver, Eau Claire, WI (US)

(73) Assignee: EZCONTROL LLC, Eau Clare, WI (US)

(*) Notice: Subject to any disclaimer, the term of this patent is extended or adjusted under 35 U.S.C. 154(b) by 19 days.

This patent is subject to a terminal disclaimer.

(21) Appl. No.: 17/654,468

(22) Filed: Mar. 11, 2022

(65) Prior Publication Data

US 2022/0194581 A1 Jun. 23, 2022

Related U.S. Application Data

(63) Continuation of application No. 16/312,761, filed as application No. PCT/US2017/039137 on Jun. 23, 2017, now Pat. No. 11,299,270.

(Continued)

(51) Int. Cl.
*B64C 39/02* (2023.01)
*H04W 4/46* (2018.01)
(Continued)

(52) U.S. Cl.
CPC ......... *B64C 39/024* (2013.01); *G05D 1/0094* (2013.01); *G05D 1/12* (2013.01);
(Continued)

(58) Field of Classification Search
CPC ...... B64C 39/024; G05D 1/0094; G05D 1/12; H04W 4/46; H04W 4/90; H04W 4/38;
(Continued)

(56) References Cited

U.S. PATENT DOCUMENTS 7,134,088 B2 11/2006 Larsen
8,328,130 B2 12/2012 Goossen
(Continued)

FOREIGN PATENT DOCUMENTS

CA 2676342 A1 * 7/2008 ............. G01S 19/11
CA 2983349 C * 4/2022 ............... E01F 9/30
(Continued)

OTHER PUBLICATIONS

International Search Report for International Application No. PCT/US2017/223531, dated Sep. 7, 2017 (2 pages).
(Continued)

*Primary Examiner* — Mahendra R Patel
(74) *Attorney, Agent, or Firm* — FINNEGAN, HENDERSON, FARABOW, GARRETT & DUNNER, LLP

(57) ABSTRACT

An unmanned aerial system (UAS) may comprise an unmanned aerial vehicle (UAV) configured to search and recover persons and things, collect and produce data of an emergency situation for display on a vehicle navigation system, or explore for natural resources. The UAS may include a landing pad, and/or a sensor such as a ground penetrating sensor configured to search for a person trapped underground. The UAS may be configured to receive data from the one or more sensors. An analyzer may be used to assess surrounding environment and the status of the person or thing, and send a signal to the UAV. The components attached to the UAV may include connectors, a robotic arm, a sensor, and/or a portable power source. The UAS may be configured to, for example, detect an emergency situation and determine the nature and location of the emergency situation. The UAS may be configured to explore for oil, gas, and mineral sources, and/or excavate location using a robotic arm.

19 Claims, 30 Drawing Sheets

Related U.S. Application Data

(60) Provisional application No. 62/356,004, filed on Jun. 29, 2016, provisional application No. 62/354,159, filed on Jun. 24, 2016.

(51) Int. Cl.

| | | |
|---|---|---|
| *H04W 4/90* | (2018.01) | |
| *G05D 1/00* | (2006.01) | |
| *G05D 1/12* | (2006.01) | |
| *B64U 101/30* | (2023.01) | |

(52) U.S. Cl.
CPC ............... *H04W 4/46* (2018.02); *H04W 4/90* (2018.02); *B64U 2101/30* (2023.01)

(58) Field of Classification Search
CPC .. H04W 4/021; H04W 4/029; B64U 2101/30; B64U 80/86
USPC ...................................................... 455/404.1
See application file for complete search history.

(56) References Cited

U.S. PATENT DOCUMENTS

| | | | | |
|---|---|---|---|---|
| 8,930,044 | B1* | 1/2015 | Peeters | B64C 19/00 |
| | | | | 709/201 |
| 9,051,043 | B1* | 6/2015 | Peeters | G05D 1/102 |
| 9,087,451 | B1* | 7/2015 | Jarrell | G08G 5/003 |
| 9,254,363 | B2 | 2/2016 | Levien | G05D 1/0202 |
| 9,533,759 | B2* | 1/2017 | Jones | G06Q 30/0267 |
| 9,665,094 | B1* | 5/2017 | Russell | G01P 5/00 |
| 9,834,306 | B2* | 12/2017 | Almasoud | H04B 7/18506 |
| 9,866,673 | B2* | 1/2018 | Gabel | H04W 4/02 |
| 9,875,454 | B2* | 1/2018 | Kantor | H04W 4/024 |
| 9,950,791 | B2* | 4/2018 | Blomberg | B64F 1/368 |
| 10,212,570 | B1 | 2/2019 | Ramalingam | |
| 10,372,122 | B2 | 8/2019 | Zach | |
| 10,553,122 | B1* | 2/2020 | Gilboa-Amir | B64F 1/368 |
| 10,683,088 | B2* | 6/2020 | Erickson | B64C 39/024 |
| 10,839,336 | B2 | 11/2020 | Greiner et al. | |
| 2011/0011323 | A1 | 1/2011 | Wiggins et al. | |
| 2012/0152654 | A1 | 6/2012 | Marcus | |
| 2013/0076862 | A1 | 3/2013 | Ohtomo et al. | |
| 2013/0218456 | A1* | 8/2013 | Zelek | G01C 21/3652 |
| | | | | 701/411 |
| 2014/0062754 | A1 | 3/2014 | Mohamadi | |
| 2014/0172357 | A1* | 6/2014 | Heinonen | G01C 21/005 |
| | | | | 702/150 |
| 2014/0231590 | A1* | 8/2014 | Trowbridge | G08G 5/0039 |
| | | | | 244/175 |
| 2014/0323079 | A1 | 10/2014 | Paolini | |
| 2015/0019267 | A1 | 1/2015 | Prieto et al. | |
| 2015/0148988 | A1* | 5/2015 | Fleck | B64D 1/14 |
| | | | | 701/2 |
| 2015/0164376 | A1 | 6/2015 | Huang | |
| 2016/0093212 | A1* | 3/2016 | Barfield, Jr | G08G 1/04 |
| | | | | 348/144 |
| 2017/0253330 | A1* | 9/2017 | Saigh | G08G 5/0069 |
| 2018/0253092 | A1* | 9/2018 | Trapero Esteban | B64C 39/024 |
| 2020/0297955 | A1 | 9/2020 | Shouldice | |

FOREIGN PATENT DOCUMENTS

| | | | | |
|---|---|---|---|---|
| CN | 202426514 | U | 9/2012 | |
| CN | 107430402 | A * | 12/2017 | ............ G01S 19/11 |
| KR | 20130076862 | A | 7/2013 | |
| RU | 2223542 | C2 | 2/2004 | |
| TW | 202108450 | A * | 3/2021 | .......... B64C 39/024 |
| WO | WO-2015157883 | A1 * | 10/2015 | ........... B64C 39/024 |
| WO | WO-2016131005 | A1 * | 8/2016 | ............ B64C 39/02 |
| WO | WO-2016179637 | A1 * | 11/2016 | ................ E01F 9/30 |

OTHER PUBLICATIONS

Written Opinion of the International Search Authority for International Application No. PCT/US2017/223531, dated Sep. 7, 2017 (5 pages).

\* cited by examiner

SYSTEMS AND METHODS FOR UNMANNED AERIAL VEHICLES

RELATED APPLICATIONS

This application is a continuation of U.S. patent application Ser. No. 16/312,761, filed on Dec. 21, 2018, which is a national stage entry of International Application No. PCT/US2017/039137, filed on Jun. 23, 2017, which claims priority to U.S. Provisional Application Nos. 62/354,159 (filed Jun. 24, 2016) and 62/356,004 (filed Jun. 29, 2016). The disclosures of the above-referenced applications are expressly incorporated herein by reference in their entirety.

BACKGROUND

Technical Field

This disclosure relates generally to unmanned aerial vehicles. More specifically, this disclosure relates to systems and methods for searching and recovering a person or thing and providing a traffic control.

Background Description

The use of unmanned aerial vehicles (UAVs), also referred to as drones, has increased drastically in popularity throughout the last decade while consumer UAVs have decreased in price. Other technologies, such as lightweight cameras with high resolutions and smart phones configured to control Unmanned Aerial Systems (UASs) (e.g., UAVs and associated systems), have further increased the speed at which consumers adopt these devices.

Today, many industries make use of UASs such as film makers, oil platform workers, militaries, and law enforcement. For example, film makers and television producers may use UASs that carry cameras to capture video that they otherwise could not capture using low-cost camera rigs. As opposed to using a platform or cable-suspended camera system to acquire overhead views, UASs may fly into the air and, with the help of a remote display, capture video from an overhead angle. Similarly, oil platform workers are able to use UASs to view portions of oil platforms that may need repair, without the need for a worker to put themselves in a dangerous position. For example, a UAS may fly around an oil platform over water, which eliminates the risks faced by workers hanging over an edge of a platform by a rope to examine platform supports. Military and law enforcement, likewise, may use UASs to gather intelligence without placing themselves in dangerous positions where they may be injured. UASs allow military and law enforcement to view areas from overhead without risking the life of a pilot or a person attempting to enter a potentially dangerous area.

As technology continues to improve and decrease in cost, an increasing amount of hobbyists are using UASs for various purposes. Hobbyists use UASs to capture overhead video of their homes, which was previously difficult to achieve at such a low cost. Hobbyists may also use the video capturing capabilities of UASs to capture video of themselves as they hike up a mountain, skate board down a hill, or go river rafting. In some UASs, a UAV may be configured to automatically hover at a particular height and distance from a remote control such as a smart phone or a radio transmitter. Thus, as a hobbyist rolls down a hill or floats down a river, they are able to single-handedly obtain a professional looking video that is taken from a fixed distance and height.

One problem of UASs is their ability to perform tasks in remote locations without human intervention, such as investigation of natural or man-made disaster and evacuation activities. Searching and rescuing stranded persons or things is typically performed by teams in emergency vehicles. Similarly, investigation and evidence preservation of a crime scene is typically performed by officers who subsequently arrive at the scene. The timeliness and effectiveness of these activities frequency depends on various factors such as the weather and the hazardous condition. These operations can be also limited by the availability of helicopters and officers. Accessing scenes by a helicopter or a car generally involves risks. For example, stormy weather may prohibit dispatch of a helicopter. Icy road conditions may delay rescue EMT's activities. Or there may not be enough helicopters in a mass-casualty situation.

UAVs may overcome some of the shortfalls of manned search, recovery, and rescue systems. UAVs used in rescue and investigations may not need an operator on the scene and may be able to assess the scene and search the object to be recovered without using human eyes. Thus, there is a need in the art for a UAV configured to search, recover, and rescue a person in need of rescue without human observation on site.

Another problem faced by UASs is their ability to perform tasks that would normally be done by multiple different systems, such as traffic control and notification. In response to an emergency event, such as a traffic accident, first responders may have difficulty locating the accident, alerting oncoming traffic, and diverting traffic such that the emergency responders can safely perform their duties. The use of UAVs in traffic control and notification may increase the safety and flexibility involved in responding to an emergency event.

UAVs used in traffic control may typically be small in size and portable. But these UAVs must be able to carry equipment such as LED screens, projectors, and occasionally heavier equipment. Due to their size, UAVs often require small, lightweight batteries that tend to run out of power quickly. In particular, the heavier a UAV and its payload is, the faster it typically runs out of power. To overcome this problem, tethers are often used to power UAVs. Tethered UASs are able to operate for longer periods of time without running out of power. However, tethers often introduce their own problems such as portability. For example, a tether may be connected to a power converter, which in turn may need to be connected to a power source, such as an electrical outlet. In such an example, a UAV's range is limited to the length of the tether and a power cord connecting the converter to an outlet. Thus, there is a need in the art for a UAV configured to provide advertising to be able to carry heavy equipment and/or fly for extended periods of time, without being limited by its distance from a fixed power source.

The present disclosure is directed toward improvements in existing technologies for unmanned aerial systems.

SUMMARY

In an exemplary embodiment, the present disclosure is directed to an unmanned aerial system (UAS) that includes an unmanned aerial vehicle (UAV) and a sensor. In some embodiments, the sensor may be a ground penetrating sensor. The UAV may be configured to receive data from the sensor to determine a location, for example an underground depth, of a person or thing. In some embodiments, the thing searched for may be a natural resource. The UAV may be configured to land on a landing pad in a control center. In some embodiments, the UAV may be configured to receive power and data through Power Over Ethernet (POE). The UAV may also be configured to measure physiological parameters of the person using a robotic arm and determine a severity of an injury or disease. The UAS may be configured to detect an emergency situation and transmit an alert indicating the location and nature of the emergency situation to a vehicle. The UAV may also be configured to obtain data of the emergency situation and transmit the data for reconstruction of the scene.

In another exemplary embodiment, the present disclosure is directed to a method of search and recovery by a UAV. The method may include navigating to an area and searching for a person or thing using one or more sensors. The one or more sensors may include a ground penetrating sensor and the area may be a predetermined area. The method may include recovering the person or the thing using a carrying component. The method may further include scanning an area for a person in need of rescue using the one or more sensors and capturing data from the one or more sensors during the scanning, analyzing the captured data to determine whether there is a person in need of rescue and determining a location of the person in need of rescue based on the analyzed data.

In another exemplary embodiment, the present disclosure is directed to a method of emergency situation alert by a UAV. The method may include navigating to the emergency situation and searching for a person or thing using one or more sensors. The method may also include assessing conditions around the emergency situation and creating data for display on a vehicle navigation system or communication device to inform a user of the emergency situation. The method may comprise receiving data indicating the emergency situation. The method may include detecting the emergency situation using the one or more sensors. The method may also include determining a nature and a location of the emergency situation using the one or more sensors. The method may include transmitting the data to notify a person or a vehicle of the emergency situation.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF DRAWINGS

The accompanying drawings, which comprise a part of this specification, illustrate several embodiments and, together with the description, serve to explain the disclosed principles. In the drawings.

DETAILED DESCRIPTION

Figure 1:
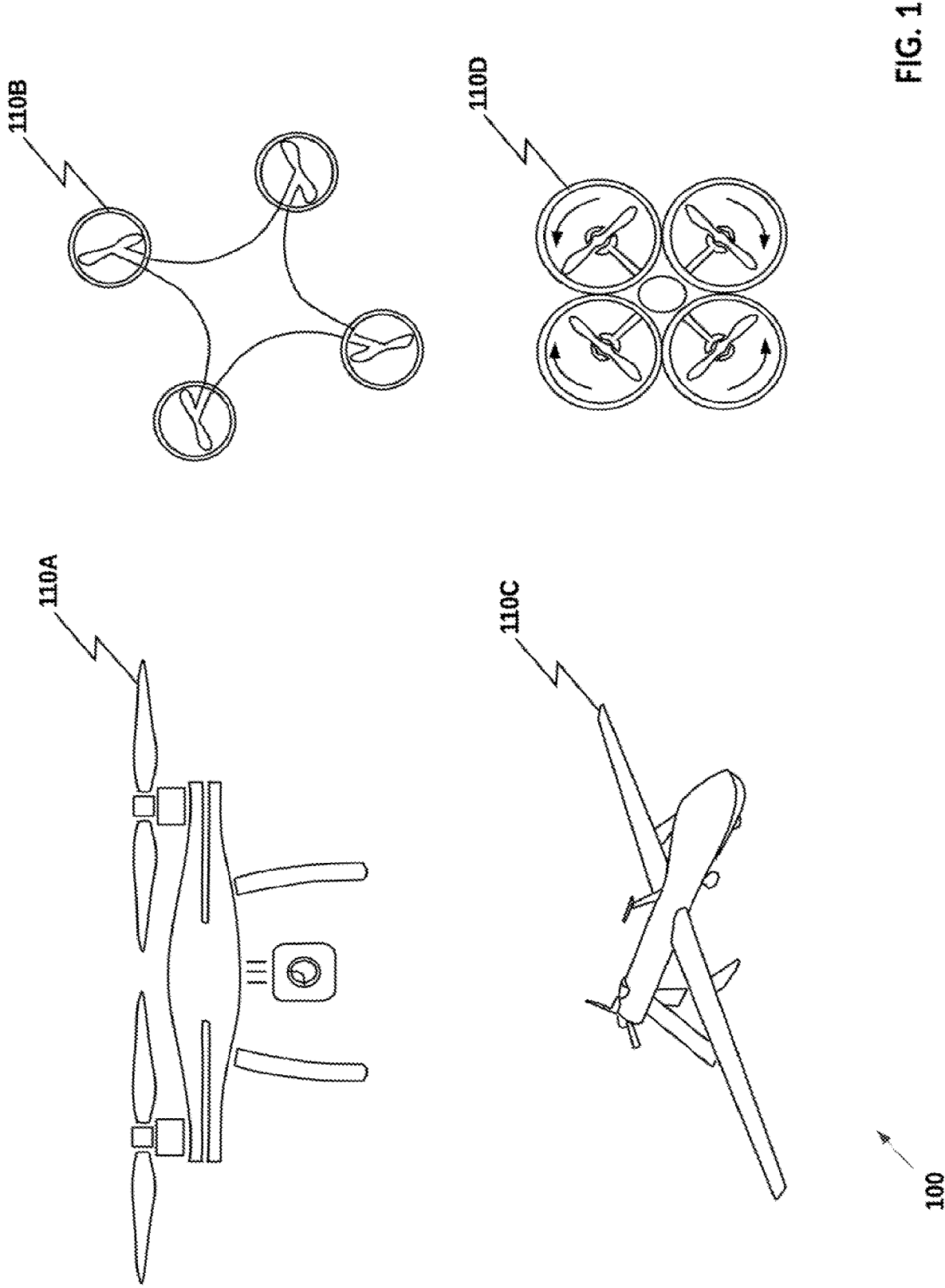
FIG. 1 illustrates exemplary unmanned aerial vehicles, consistent with disclosed embodiments.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be interpreted as open ended, in that, an item or items following any one of these words is not meant to be an exhaustive listing of such item or items, or meant to be limited to only the listed item or items.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems and methods described herein should not be construed as limiting in any way. Instead, the present disclosure is directed toward all novel and non-obvious features and aspects of the various disclosed embodiments, alone and in various combinations and sub-combinations with one another. The disclosed systems and methods are not limited to any specific aspect or feature or combinations thereof, nor do the disclosed systems and methods require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Reference will now be made in detail to the drawings. Herein, the terms "unmanned aerial vehicle" or "UAV" will generally refer to the powered flying portion of an "unmanned aerial system" or "UAS." For example, a UAV may be a quadcopter, while a UAS may be a quadcopter, a tether, a portable power source, and a remote control. Other types of UAVs and/or UASs are consistent with this disclosure, such as, for example, single-propeller UAVs, fixed wing UAVs, UAVs with variable propeller pitches, UAVs with multiple propellers (e.g., 2, 4, 6, 8), UAVs with turbine engines, etc.

Systems and methods consistent with the present disclosure are directed to a UAS comprising a UAV configured to perform functions to control traffic in response to an emergency event. Various UAVs described herein may be configured to remain airborne for long periods of time and fly in diverse weather conditions. In some embodiments, a UAV may be housed on a platform attached to an emergency response vehicle. In some embodiments, the UAV may carry a display screen and be configured to provide a warning message in the area. In some embodiments, the UAV may be configured to collect and transmit data about an emergency event to a remote device. In some embodiments, a portable power source may be physically connected to a tether capable of transmitting power and data, which may in turn be connected to the UAV. In some embodiments, a portable power source may comprise one or more batteries, generators, solar panels, or other components that acquire, store, and/or transmit power to a UAV. The portable power source may be a stand-alone device that is small enough to be transported in, for example, an automobile. The power source may be removed from a vehicle, activated, and connected to a UAV to power it for longer periods of time than a battery within the UAV itself. In other embodiments, the UAV may house a battery, which may be quickly charged or swapped out to increase flight time.

In some embodiments, the UAV may include a connector that allows external components to attach to the UAV. A connector may be configured to allow a UAV to carry external components. For example, external components may include a screen, robotic arm, projectors, platforms, etc. External components may be used to display warning messages to nearby traffic over a large area for a period of time.

In some embodiments, the UAV may land on an elevated landing area, a portable landing area, a remote landing area, or the like. For example, in some embodiments, the landing area may include a portable power source and be elevated such that the UAV may land or otherwise be stored such that it is not damaged. As another example, the landing area may be portable landing area that can be driven or remotely controlled to drive to a predetermined area. As another example, the landing area may be at a remote location and provide shelter for the UAV to protect it from weather or other damage. In some embodiments, the UAS may comprise functionality that causes the UAV to land on a landing pad automatically. For example, a UAV may fly for a particular period of time and, in response to an adverse weather condition, initiate a landing process wherein the UAV automatically lands on the landing pad without additional operator input. As another example, a UAV may fly for a predetermined amount of time and then automatically land on the landing pad. In some embodiments, the landing area (e.g., a platform, hanger, other surface, etc.) may be included in the UAS.

FIG. 1 illustrates exemplary unmanned aerial vehicles 100 according to some embodiments of the present disclosure. FIG. 1 includes a side view of a UAV 110A, a top view of a UAV 110B with four propellers, a UAV 110C having a rearward facing propeller, and a UAV 110D having larger propellers with propeller guards that contact one another. Exemplary UAVs 110A, 110B, and 110D may be referred to as quadcopters, although it should be appreciated that a UAV could have any number of propellers or other thrust generators. For example, a UAV may have one, two, three, four, or more propellers. In some embodiments, a UAV may have a thrust generator other than propellers, such as a turbine engine.

UAVs 110A, 110B, and 110C, may be propelled by four vertically oriented propellers, which may include two pairs of identical fixed pitched propellers wherein one pair is configured to rotate clockwise, and the second pair is configured to rotate counter-clockwise (as shown by UAV 110D). In exemplary embodiments, independent variation in the speed of each rotor may be used to control a UAV. By changing the speed of each rotor, a UAV may rotate, move forward, move backward, move higher and/or move lower. Quadcopters differ from conventional helicopters which use rotors that are able to dynamically vary the pitch of their blades as they move around a rotor hub. Generally, quadcopters are less expensive and more durable than conventional helicopters. Their smaller blades produce less kinetic energy, reducing their ability to cause damage. However, as the size of a vehicle increases, fixed propeller quadcopters become less advantageous. Larger blades increase the momentum of a UAV causing destabilization, and changes in blade speed take longer which negatively impacts control.

Figure 2:
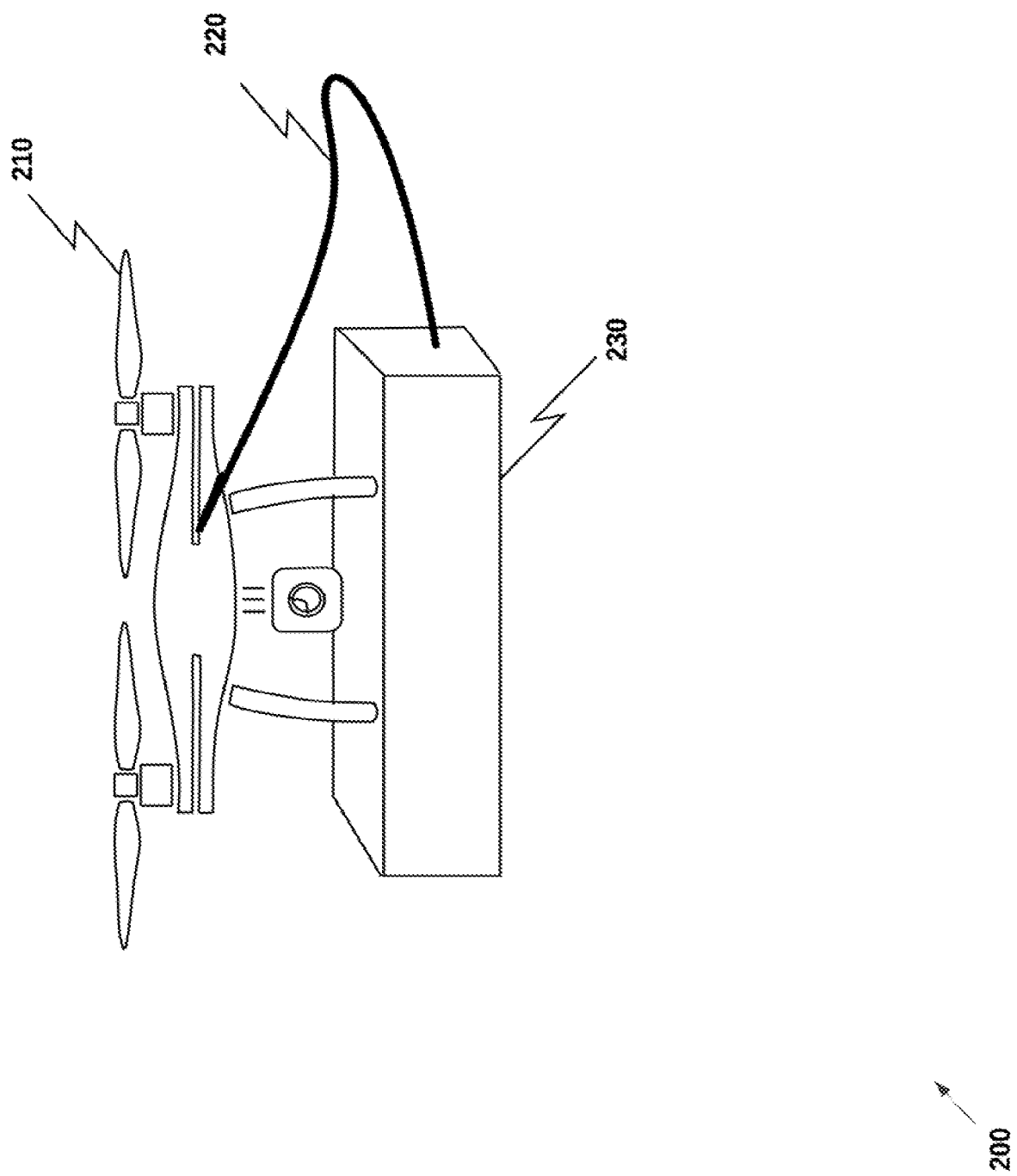
FIG. 2 illustrates an exemplary unmanned aerial system having a portable power source and a tether, consistent with disclosed embodiments.

FIG. 2 illustrates an exemplary unmanned aerial system (UAS) 200 having a portable power source and a tether according to some embodiments of the present disclosure. As shown in FIG. 2, for example, UAV 210 is connected to tether 220, which is also connected to portable power source 230. Portable power source 230 may transmit data and/or power to UAV 210 via tether 220. Tether 220 may include multiple cables which may power or control various portions of UAV 210.

In some embodiments, portable power source 230 may include one or more batteries and/or individual battery cells. Batteries and/or cells included in portable power source 230 may be of the same type or different types. In some embodiments, batteries and/or cells included in portable power source 230 may be charged via a connector other than tether 220, such as a cable which may be plugged into a standard electric outlet or connected to power from a power pole. Further, it is contemplated that a plurality of portable power sources may be connected to each other to provide additional power to a UAS. Batteries and/or cells may be configured in a series, parallel, or a mixture of both to deliver a desired voltage, capacity, or power density. Portable power source 230 may include rechargeable batteries, and a temperature sensor which a battery charger may use to detect whether batteries are finished charging. Portable power source 230 may include battery regulators to keep the peak voltage of each individual battery or cell below its maximum value to allow other batteries to fully charge, such that the batteries are balanced. Portable power source 230 may include other battery balancing devices configured to transfer energy from charged batteries to less charged batteries.

In some embodiments, portable power source 230 may include a generator. The generator may be gasoline powered, or may be powered by other fuels such as diesel, bio-diesel, kerosene, propane, natural gas, or other suitable fuel. portable power source 230 may have a storage tank (not shown) for storing fuel and may be refilled.

In some embodiments, portable power source 230 may include one or more solar panels. Solar panels may be used to provide power directly to UAV 210 through tether 220. Solar panels may also be used to recharge batteries included in portable power source 230. Solar panels may also be used to supplement power from a generator.

As described above, in some embodiments, portable power source 230 may include an area on which UAV 210 may land. For example, FIG. 2 may illustrate a UAV 210 after it has landed on a landing surface of portable power source 230. In some embodiments, UAV 210 may automatically land on a surface of portable power source 230. For example, an operator may fly UAV 210 for a length of time, after which the operator enters a command causing UAV 210 to determine its location and/or distance to portable power source 230. Next, UAV 210 may move to and land on a surface of portable power source 230. In another example, UAV 210 may automatically land in response to a determination that its batteries (whether onboard or in portable power source 230) store less than a threshold amount of power. For example, after power source 230 is storing less than 10% of the maximum amount of power it can store, power source 230 may send signals to UAV 210 causing UAV 210 to land. In some embodiments, a command causing UAV 210 to land may be sent in response to a combination of an amount of power in portable power source 230, and a distance between portable power source 230 and UAV 210. For example, if UAV 210 is close to portable power source 230 (e.g., within 20 meters), it may receive a command to land if the power in portable power source 230 is less than a certain amount (e.g., 10%). On the other hand, in some embodiments, if UAV 210 is farther away from power source 230 (e.g., farther than 40 meters), it may receive a command to land if the power in portable power source 230 is less than a higher amount (e.g., 20%).

Figure 3:
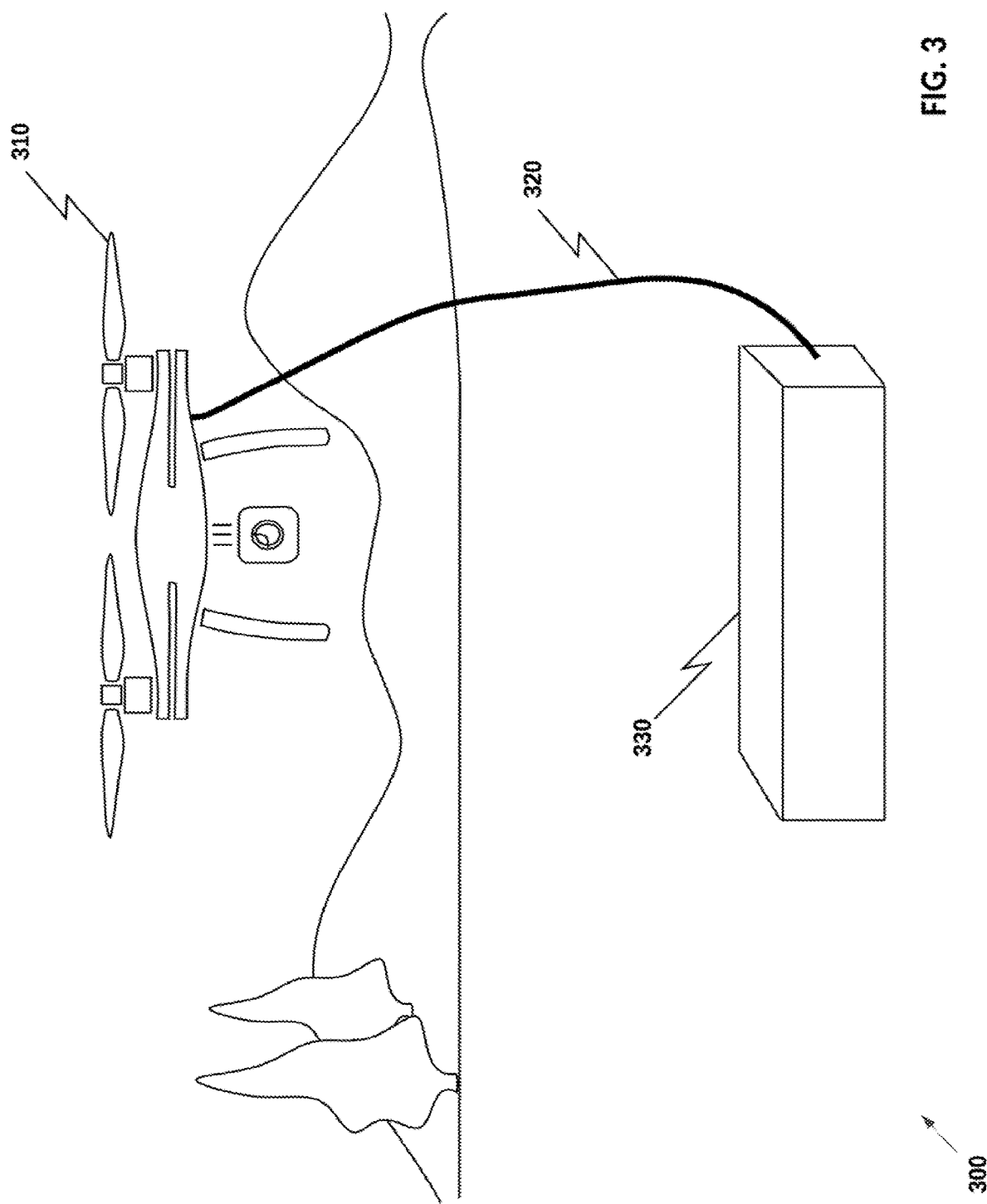
FIG. 3 illustrates an exemplary unmanned aerial system having a portable power source and a tether, consistent with disclosed embodiments.

FIG. 3 illustrates an exemplary UAS 300 having a portable power source and a tether according to some embodiments of the present disclosure. As shown in FIG. 3, for example, UAV 310 may fly while being connected to portable power source 330 via tether 320.

In some embodiments, tether 320 may be configured to extend or retract into portable power source 330. Such extension or retraction may be caused by a remote control or UAV 310 flying away or toward portable power source 330. In some embodiments, a desired amount of tension on tether 310 may be set. For example, an operator may wish tether 310 to have a particular amount of slack. An operator may increase, decrease, or enter a particular amount of tension using a remote control. In some embodiments, a desired amount of tension on tether 310 may be predetermined (e.g., programmed into a memory included in UAV 310 or portable power source 310). For example, a preprogrammed amount of tension may be based on certain conditions either detected by a sensor included in UAV 310 or portable power source 330. In some embodiments, certain tensions could be based on events and/or conditions. For example, profiles may be created for various events and/or conditions such that a UAS behaves in a particular manner based on that profile (e.g., due to a threshold amount of wind, tension on a tether may be substantially greater than when wind is less than the threshold).

Figure 4:
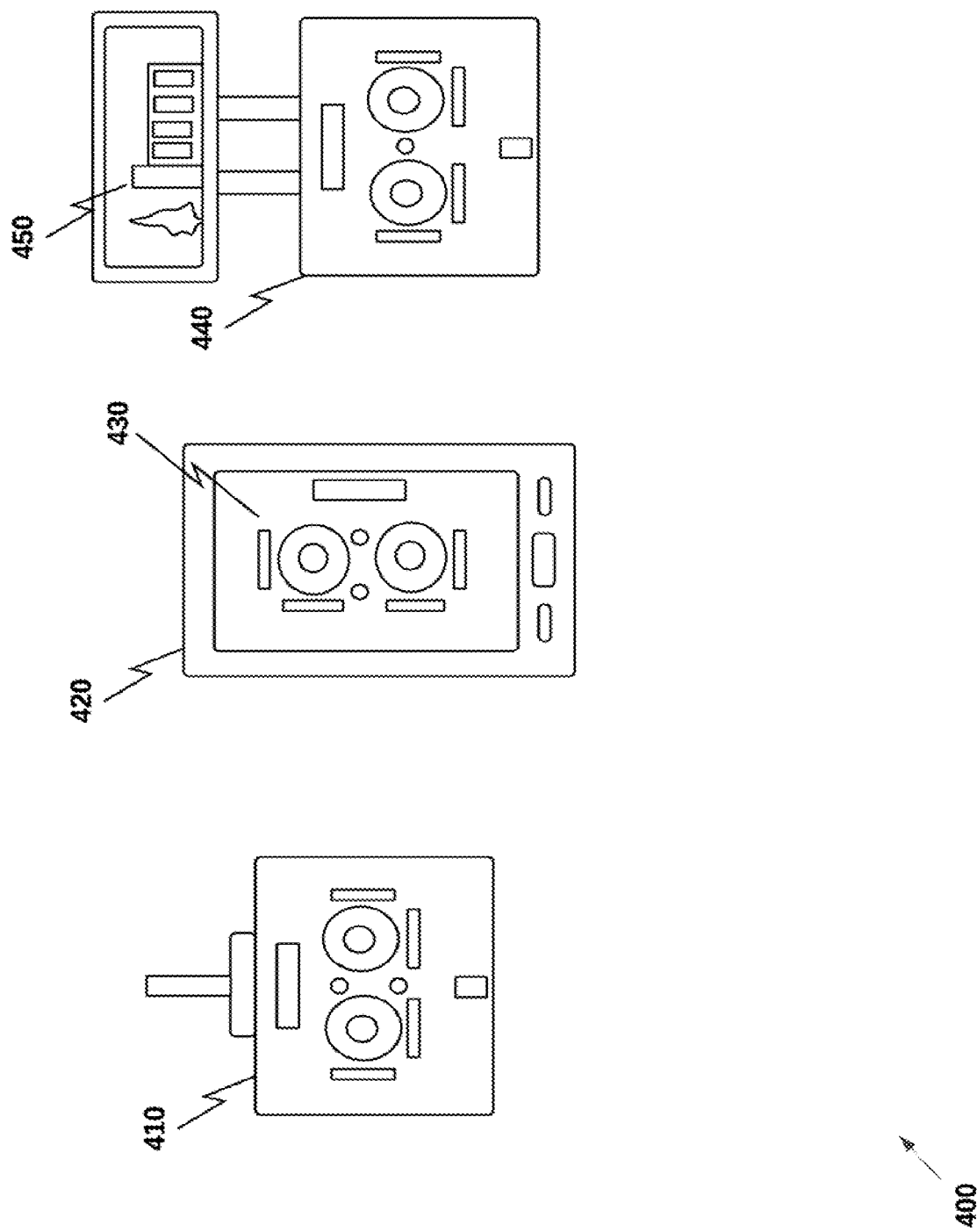
FIG. 4 illustrates exemplary remote controls, consistent with disclosed embodiments.

FIG. 4 illustrates exemplary remote controls 400 according to some embodiments of the present disclosure. As shown in FIG. 4, for example, remote controls 410, 420, and 440 may control functionality of a UAS. For example, remote control 410 may include two joysticks (one for moving a UAV forward, backward, left, or right, and another for moving a UAV up or down and rotating the UAV left or right). In addition, an example remote control 410 may include switches to control the trim of a joystick above and below each joystick. Trim may apply a small constant offset to a control in order to make an aircraft fly correctly. For example, if a UAV veers to the left when in flight, the trim switch below the left joystick may be moved to the right such that the UAV is stable when an operator is not touching the joysticks.

FIG. 4 also illustrates an example remote control 420, which includes an electronic device with a display 430 (e.g., a user interface). Example remote control 420 can be configured to have a variety of controls, since the controls are shown on display 430. Example remote control 420 may be a personal digital assistant, a smart phone, a tablet, a smart watch, a laptop, or other devices with display 430. In some embodiments, display 430 may be configured to show a joystick in one mode, and the view from a camera connected to a UAV in another mode. In various embodiments other modes may be available, which may allow an operator to command a UAV to land, tighten the slack on a tether, enter a message to send via a display or speaker, etc. Of course, display 430 may be a touch display that allows an operator to move virtual joysticks, etc.

FIG. 4 also illustrates a remote control 440 that includes a physical remote control and a display 450. Similar to remote control 420, display 450 included in (and/or connected to) remote control 440 may be a touch screen, and allow an operator to enter various commands to control a UAV and/or its connected components. In some embodiments, the joysticks included in remote control 440 may allow an operator to control the flight of a UAV, while display 450 may simultaneously display the view from a camera connected to the UAV. In some embodiments, remote control 420 and/or display 450 may be used to determine the position at which a camera is capturing images or film. Similarly, remote control 440 and/or display 450 may be configured to allow an operator to aim a hose or a light.

In some examples, controllers 410, 420, and 440 are configured to transmit one or more commands to the UAV. The one or more commands may instruct the UAV to perform inspect power lines, return to a platform, intercept an intruder, perform maintenance, etc.

Figure 5:
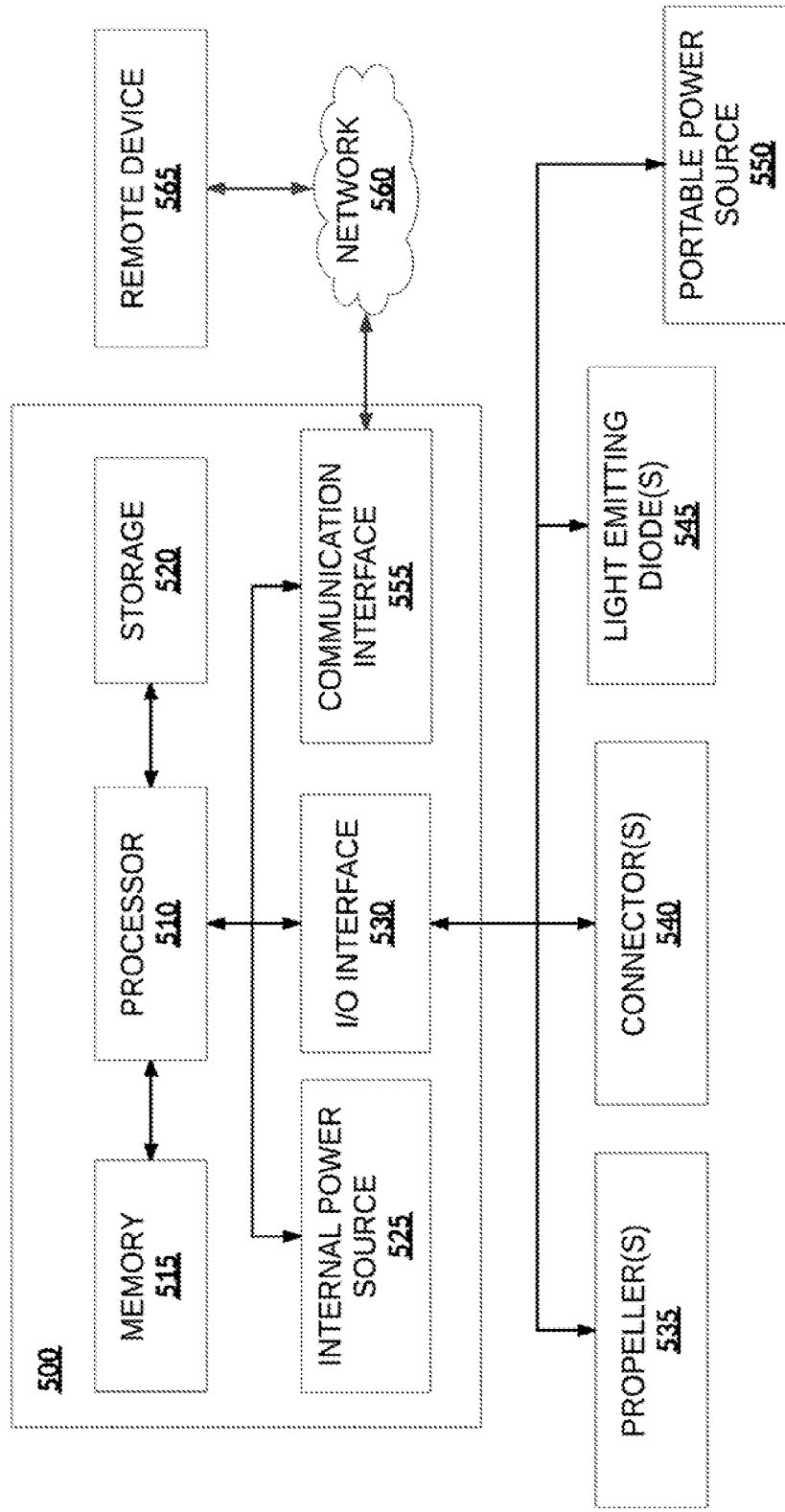
FIG. 5 illustrates a block diagram of an exemplary unmanned aerial system, consistent with disclosed embodiments.

FIG. 5 illustrates a block diagram of an exemplary UAS according to some embodiments of the present disclosure. As illustrated in FIG. 5, a UAS may include an example internal system 500, and external components including one or more propellers 535, one or more connectors 540, one or more light emitting diodes (LEDs) 545, and a portable power source 550. FIG. 5 also shows a network 560 and a remote device 565.

Example internal system 500 may have, among other things, a processor 510, memory 515, storage 520, an input/output (I/O) interface 530, and/or a communication interface 555. At least some of these components may be configured to transfer data and send or receive instructions between or among each other. Processor 510 may be configured to receive signals from the components shown in FIG. 5, and process the signals to determine one or more conditions of the operations of system a UAS. For example, processor 510 may receive signals indicating that the wind is likely causing the UAV to be unstable, and use one or more components including propellers 535 to adjust the UAV to stabilize accordingly. Processor 510 may also be configured to generate and transmit a control signal in order to actuate one or more components. For example, processor 510 may detect a signal from portable power source 550 commanding the UAV to land due to lack of power. In response, processor 510 may cause the propellers to operate in such a manner that the UAV returns to portable power source 550 and lands either on or near portable power source 550.

In operation, according to some embodiments, processor 510 may execute computer instructions (program code) stored in memory 515 and/or storage 520, and may perform exemplary functions in accordance with techniques described in this disclosure. Processor 510 may include or be part of one or more processing devices, such as, for example, a microprocessor. Processor 510 may include any type of a single or multi-core processor, a microcontroller, a central processing unit, a graphics processing unit, etc.

Memory 515 and/or storage 520 may include any appropriate type of storage provided to store any type of information that processor 510 may use for operation. Memory 515 and storage 520 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 515 and/or storage 520 may also be viewed as what is more generally referred to as a "computer program product" having executable computer instructions (program codes) as described herein. Memory 515 and/or storage 520 may be configured to store one or more computer programs that may be executed by processor 510 to perform exemplary functions disclosed in this application. Memory 515 and/or storage 520 may be further configured to store data used by processor 510.

I/O interface 530 may be configured to facilitate the communication between example internal system 500 and other components of a UAS. I/O interface 530 may also receive signals from portable power source 550, and send the signals to processor 510 for further processing. I/O interface 530 may also receive one or more control signals from processor 510, and send the signals to control the operations of one or more propellers 535, one or more connectors 540, and/or one or more LEDs 545. As discussed below in greater detail, processor 510 may receive input from one or more components connected to a UAV via I/O interface 530 and one or more connectors 540. Various devices including sensors, or a lab on a chip, for example, may be connected to a UAS via one or more connectors 540 and configured to transmit data to processor 510.

Communication interface 555 may be configured to transmit and receive data with one or more remote devices 565 over network 560. In some embodiments, network 560 may include a cellular network, the Internet, a WiFi connection, a local area network, etc. In some embodiments, remote device 565 may be a remote control as described in FIG. 4. In some embodiments, remote device 565 may be cloud storage, a monitoring system, a remote computer, etc. In one example, communication interface 555 may be configured to receive from remote device 565 a signal indicative of moving a UAV forward or backward. As another example, communication interface 555 may be configured to receive from remote device 565 a signal indicative of controlling a camera connected to a UAV via connector 540 (e.g., remote device 565 may have a button that causes a camera connected to a UAV to capture an image). Communication interface 555 may also transmit signals to processor 510 for further processing.

In another example communication interface 555 may transmit data (e.g., images received through I/O interface 530, data processed by processor 510, data stored in storage 520 or memory 515, etc.) through network 560 to remote device 565. Data transmitted by communication interface 555 may be used, for example, to continuously monitor power lines while the UA is inspecting the power lines.

Remote device 565 (e.g., a remote control) may be any type of a general purpose computing device. For example, remote device 565 may include a smart phone with computing capacity, a tablet, a personal computer, a wearable device (e.g., Google Glass™ or smart watches, and/or affiliated components), or the like, or a combination thereof. In some embodiments, a plurality of remote devices 565 may be associated with one or more persons. For example, remote devices 565 may be associated with the owner(s) of a UAV, and/or one or more authorized people (e.g., employees or inspection personnel of the owner(s) of a UAV).

In some embodiments, a UAV may include an internal power source 525. Internal power source 525 may include batteries or cells, similar to portable power source 550. Power provided to a UAV may be acquired from either internal power source 525, portable power source 550, or a stationary power source (not shown), or any combination. In some embodiments, internal power source may include rechargeable batteries or cells that may be charged via portable power source 550 or one or more solar panels (not shown). In some embodiments, a UAV may acquire some or all of its power from internal power source 525 or portable power source 550 based on certain conditions. For example, if portable power source 550 contains less than a threshold amount of power, a UAV may stop acquiring power from portable power source 550 and instead acquire power from internal power source 525. Similarly, in some embodiments a UAV may use internal power source 525 for power until internal power source 525 contains less than a threshold amount of power, at which point the UAV switches to using power from portable power source 550. Other embodiments are also contemplated. For example, a remote control may allow an operator to cause a UAV to switch between acquiring power from internal power source 525 and portable power source 550. In some embodiments, if a tether is disconnected from a UAV, the UAV may automatically begin acquiring power from internal power source 525 instead of portable power source 550.

In some embodiments, one or more propellers 535 may be configured to cause a UAV to move in one or more directions, as described above. For example, a UAV may comprise four propellers 535 wherein two rotate in a clockwise direction and two rotate in a counterclockwise direction. In such an embodiment, propellers 535 may be fixed. It should be appreciated that in some embodiments, such as where a UAV comprises a single propeller similar to a conventional helicopter, the pitch of propeller(s) 535 may be controlled by processor 510. Similarly, although not shown in FIG. 5, the flaps or ailerons of a fixed wing UAV may be controlled by processor 510 and one or more actuators (not shown).

In some embodiments, one or more connectors 540 may be coupled to I/O interface 530 (or may be included in I/O interface 530) and may be configured to attach to various external components. As described below in greater detail, a connector may be used to connect various devices such as a camera, a light, a robotic arm, an inspection module, etc. In some embodiments, a plurality of connectors 540 allow a plurality of devices to attach to a UAV (e.g., a camera and a light). In some embodiments, connector 540 may transfer data to processor 510 and/or remote device 565, and/or allow remote device 565 to control a component attached to connector 540.

In some embodiments, LEDs 545 may be included in and/or connected to a UAV system. For example, a UAV may comprise red and green LEDs 545 configured to indicate which direction a UAV is facing. A UAV may also comprise LEDs 545 that are configured to indicate other conditions such as levels of oxygen at certain altitudes, or an amount of moisture in the atmosphere, for example. In some embodiments, a UAV may comprise programmable LEDs 545. For example, a user may be able cause LEDs 545 to show a particular symbol (e.g., based on the user and/or remote device 565 controlling a UAV). LEDs 545 may also be configured to display a company's logo, or other information associated with a company. In some embodiments, it is contemplated that a tether may include LEDs 545. For example, a UAV may fly at night and its location would be visible based on a tether illuminated by LEDs 545. It is further contemplated that in some embodiments, LEDs 545, or a speaker (not shown), may project a message. For example, an operator may want to provide a message to someone on a power pole, and LEDs 545 or a speaker included in a UAV may convey a message.

Figure 6:
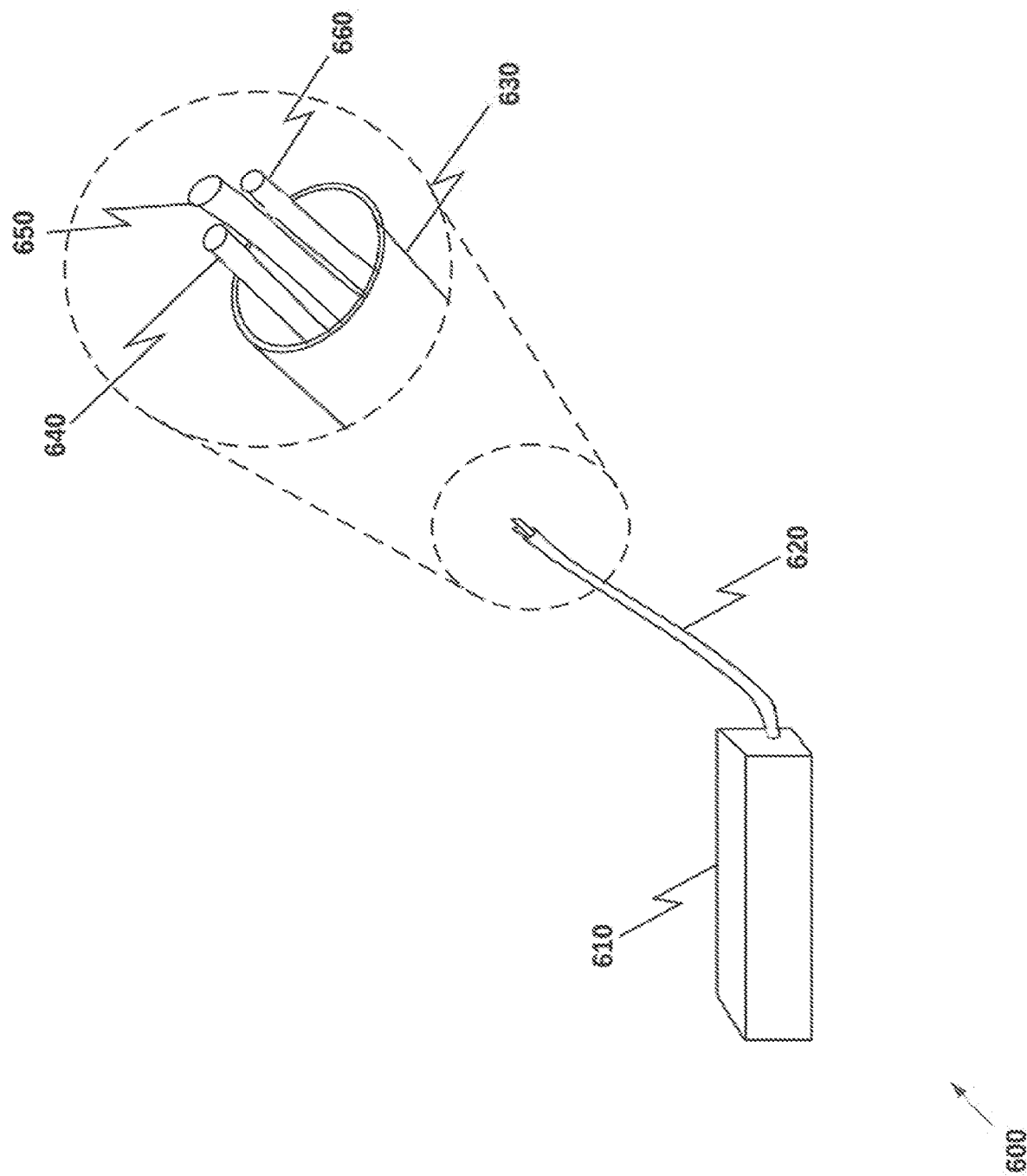
FIG. 6 illustrates an exemplary portable power source and tether, consistent with disclosed embodiments.

FIG. 6 illustrates an exemplary portable power source and tether 600 according to some embodiments of the present disclosure. As shown in FIG. 6, for example, portable power source 610 may include and/or be attached to a tether 620. Tether 620 may include a sheath 630 enclosing various cables 640, 650, and 660. In some embodiments, portable power source 610 may include a device that causes tether 620 to extend further out of portable power source 610, or retract into portable power source 610. In some embodiments, a command may be sent to portable power source 610 from a UAV or a remote control, wirelessly or otherwise, causing portable power source 610 to retract tether 620. In some embodiments, as described above, tether 620 may be configured to have a desired amount of tension. For example, a program stored in a memory of a UAV, a remote control, or portable power source 610 may indicate an amount of desired tension, and cause portable power source 610 to retract tether 620 to have a substantially desired amount of tension.

In some embodiments, the cables 640, 650, and 660 included in sheath 630 may transmit power and/or data. For example, cables 640 and 660 may transmit data to and/or from a UAV, while cable 650 may transmit power. In some embodiments, cables 640, 650, and/or 660 may be designated for particular purposes. For example, a cable 640 configured to send and/or receive data may send or receive data associated with power conditions in portable power source 610, while another cable 660 may send or receive data associated with power conditions in an internal power source of a UAV.

Figure 7:
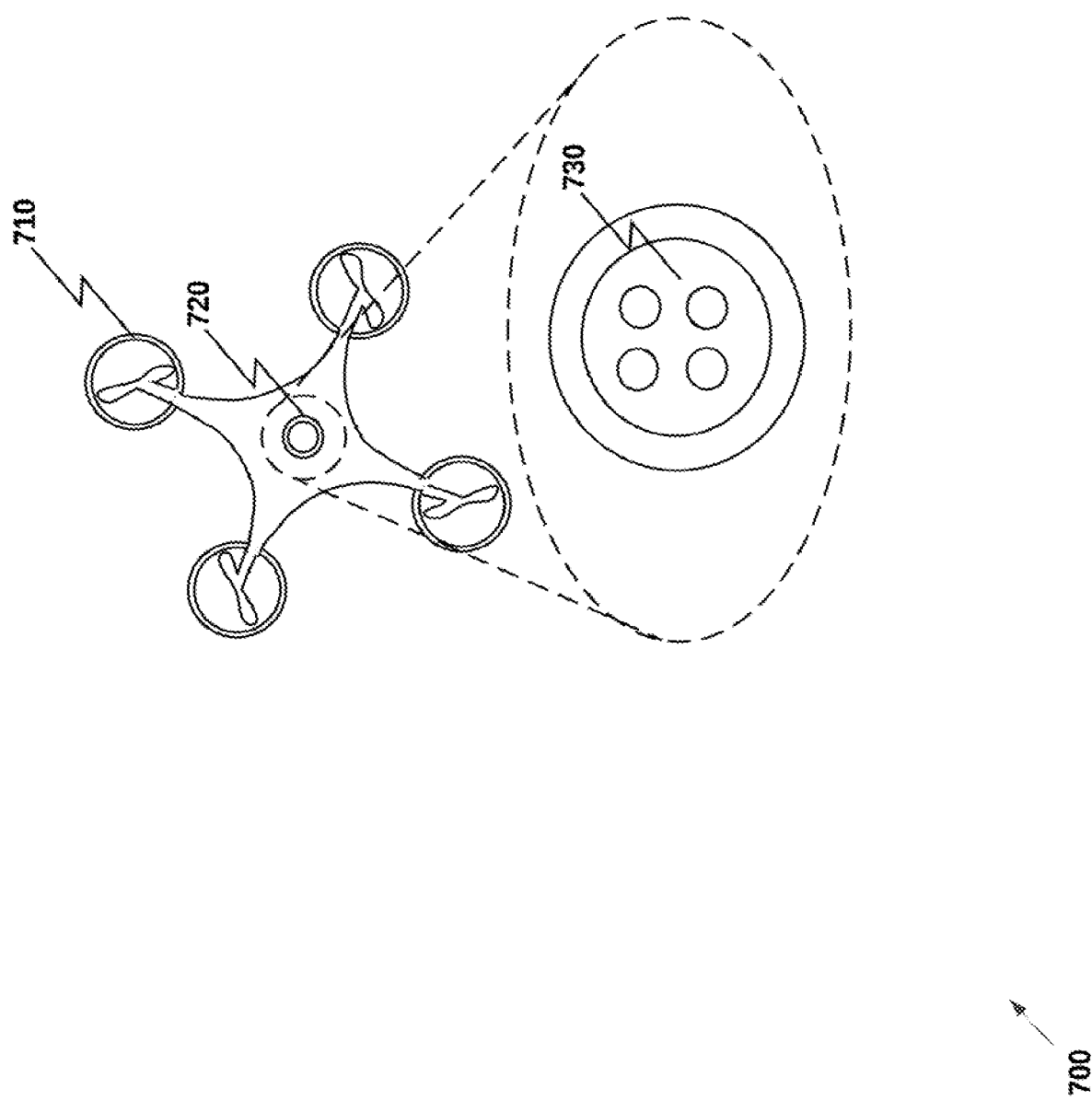
FIG. 7 illustrates an exemplary unmanned aerial system having a connector, consistent with disclosed embodiments.

FIG. 7 illustrates an exemplary unmanned aerial system 700 having a connector according to some embodiments of the present disclosure. As shown in FIG. 7, connector 720 is located on a bottom side (e.g., a side facing the ground during normal flight) of UAV 710. In various embodiments, connector 720 may contain male and/or female connections 730 as shown within connector 720. In some embodiments, more than one connector may be included in UAV 710. Further, in some embodiment, more than one component may be attached to connector 720. For example, two or three connectors may be included in a UAV and two or three components may be attached to a UAV via one, two, or three connectors.

For example, one or more cameras may be attached to connector 720. In addition to cameras, or in the alternative, inspection equipment modules may be attached to connector 720 and include, but are not limited to: a light, a robotic arm, one or more sensors (e.g., electrical conductivity sensors, electrical current sensors, oxygen sensors, carbon dioxide sensors, carbon monoxide sensors, particulate sensors, motion sensors, accelerometers, gyroscopes, microphones, etc.), a display screen, a speaker, etc.

Figure 8:
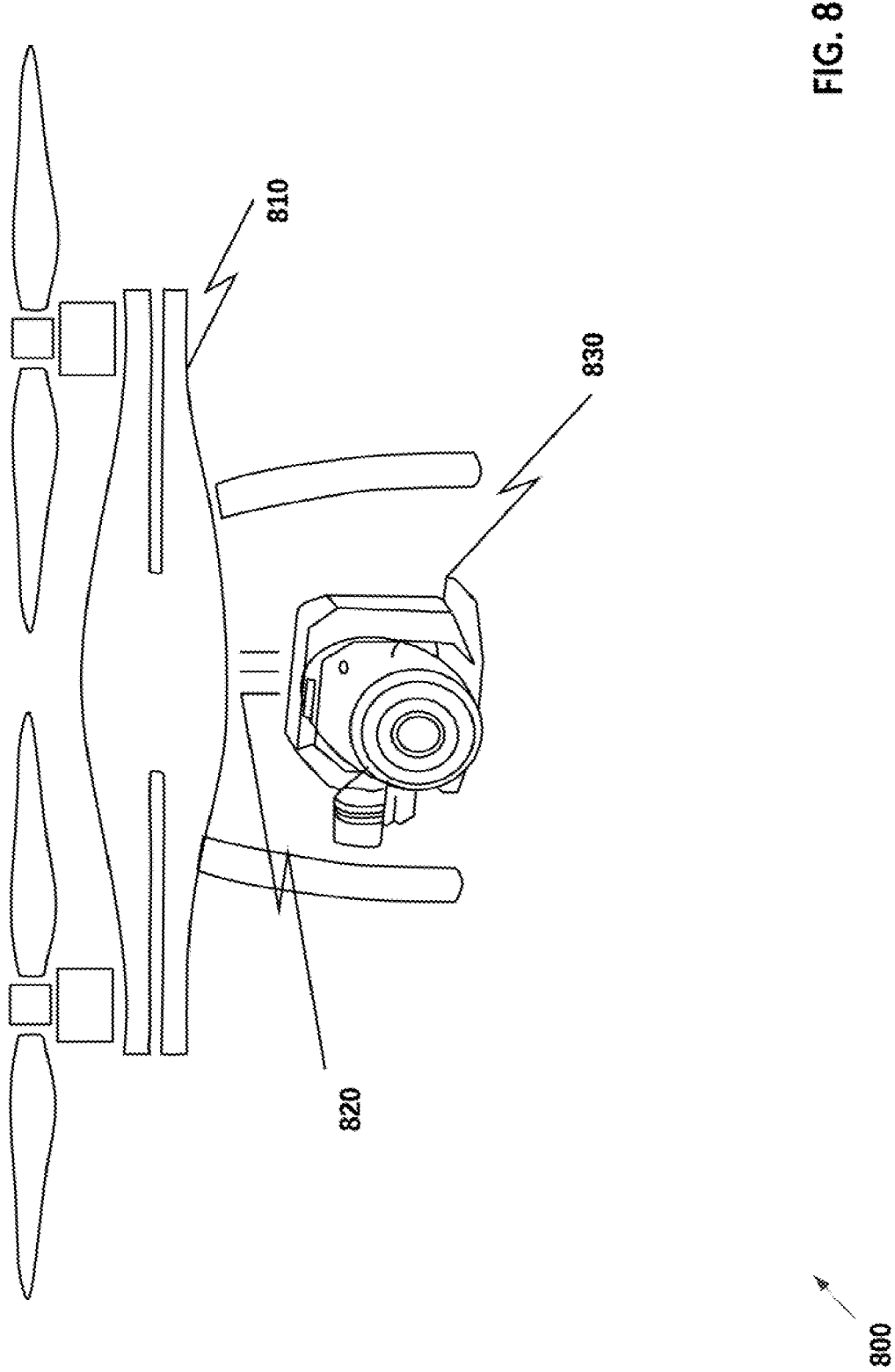
FIG. 8 illustrates an exemplary unmanned aerial system having a camera, consistent with disclosed embodiments.

FIG. 8 illustrates an exemplary unmanned aerial system 800 having a camera according to some embodiments of the present disclosure. As shown in FIG. 8, for example, UAV 810 is connected to camera 830 via connector 820. In some embodiments, UAV 810 may be connected to multiple cameras 830 or other components. For example, UAV 810 may be configured to capture images or video associated with power line inspection. The UAV may be programmed to fly in a bounded area determined by the power line location. In another example, UAV 810 may be configured to capture images or video associated with damage to a property, or any other event occurring at the location. In some embodiments, UAV 810 may fly in a pattern based on one or more images or video captured by camera 830. For example, UAV 810 may determine its distance from an object based on one or more images or video captured by camera 830. Based on the distance, UAV 810 may fly closer to, or further away from the object. In some embodiments, camera 830 may be configured to capture three-dimensional images. In such embodiments, the images may be transferred to a computer and used to create a three dimensional object (e.g., printed with an additive manufacturing device, or 3D printer).

In some embodiments, a UAS 800 may be programmed to capture one or more images or video of a particular object or person. For example, recognition software (such as facial recognition) may allow a UAS 800 to identify a person or object, and then cause UAV 810 to position itself and/or camera 830 at a certain angle and location to capture images or video of the person or object. For example, camera 830 may be used to identify a particular fault in a power line, and then UAV 810 may be caused to fly closer to that fault (e.g., to verify the presence of the fault).

In some embodiments, camera 830 may be configured to capture images or video including a remote control used to control UAV 810. For example, an operator with a remote control may be inspecting power lines, and UAV 810 may be programmed to hover around remote control (e.g., the operator as he moves around the area with the power lines) at a particular height and/or particular distance. In such an example, camera 830 may be configured to capture images or video of a remote control (and/or the operator) as it hovers around the power lines. It should be appreciated that, instead of a remote control, a camera may be configured to capture images or video of another electronic device, a person based on facial recognition, or a particular location (e.g., a latitude and longitude). Further, it should be appreciated that in embodiments described herein, a camera may be configured to receive an input that causes it to change the angle it is aimed (e.g., the direction that a lens of a camera is facing).

In some embodiments, camera 830 may be a high resolution camera, such as a digital single-lens reflex (DLSR) camera. Camera 830 may be configured to acquire video or still images, and image resolution may be configurable. Camera 830 may include one or more lenses. For example, telephoto lenses may be used to acquire images from long distance, whereas macro lenses may be used to acquire images from close range. Any number of lenses may be used with camera 830.

In some embodiments, camera 830 may be able to collect images in the dark employing technology such as forward looking infrared (FLIR), starlight, etc. Camera 830 may be used to track individuals or inspect property. For example, camera 830 may be used to detect gas leaks, overheating equipment, fires, water leakage, etc.

Figure 9:
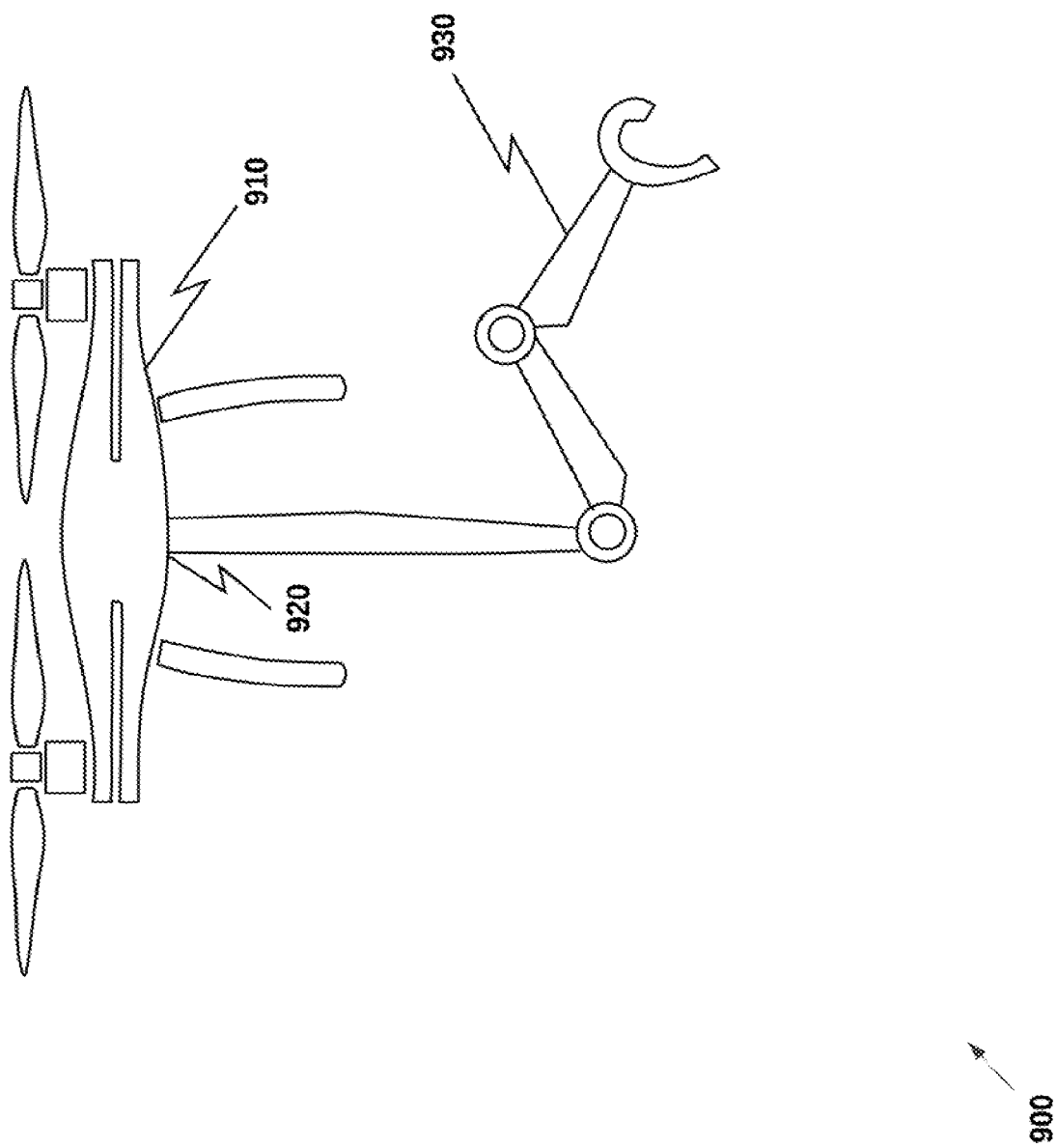
FIG. 9 illustrates an exemplary unmanned aerial system having a robotic arm, consistent with disclosed embodiments.

FIG. 9 illustrates an exemplary unmanned aerial system 900 having a robotic arm according to some embodiments of the present disclosure. As shown in FIG. 9, for example, UAV 910 is connected to a robotic arm 930 via connector 920. Robotic arm 930 may be configured to perform a variety of actions, including, but not limited to: rescuing a person (e.g., from becoming stuck on a power pole), acquiring an animal (e.g., a cat on a power pole), acquiring test equipment (e.g., test equipment left on a power pole), acquiring soil samples (e.g., to determine whether PCBs have leaked out of a transformer), acquiring water samples, moving objects (e.g., power lines attached to power poles), repairing power lines (e.g., fixing insulator elements that are damaged in a storm), etc.

Figure 10:
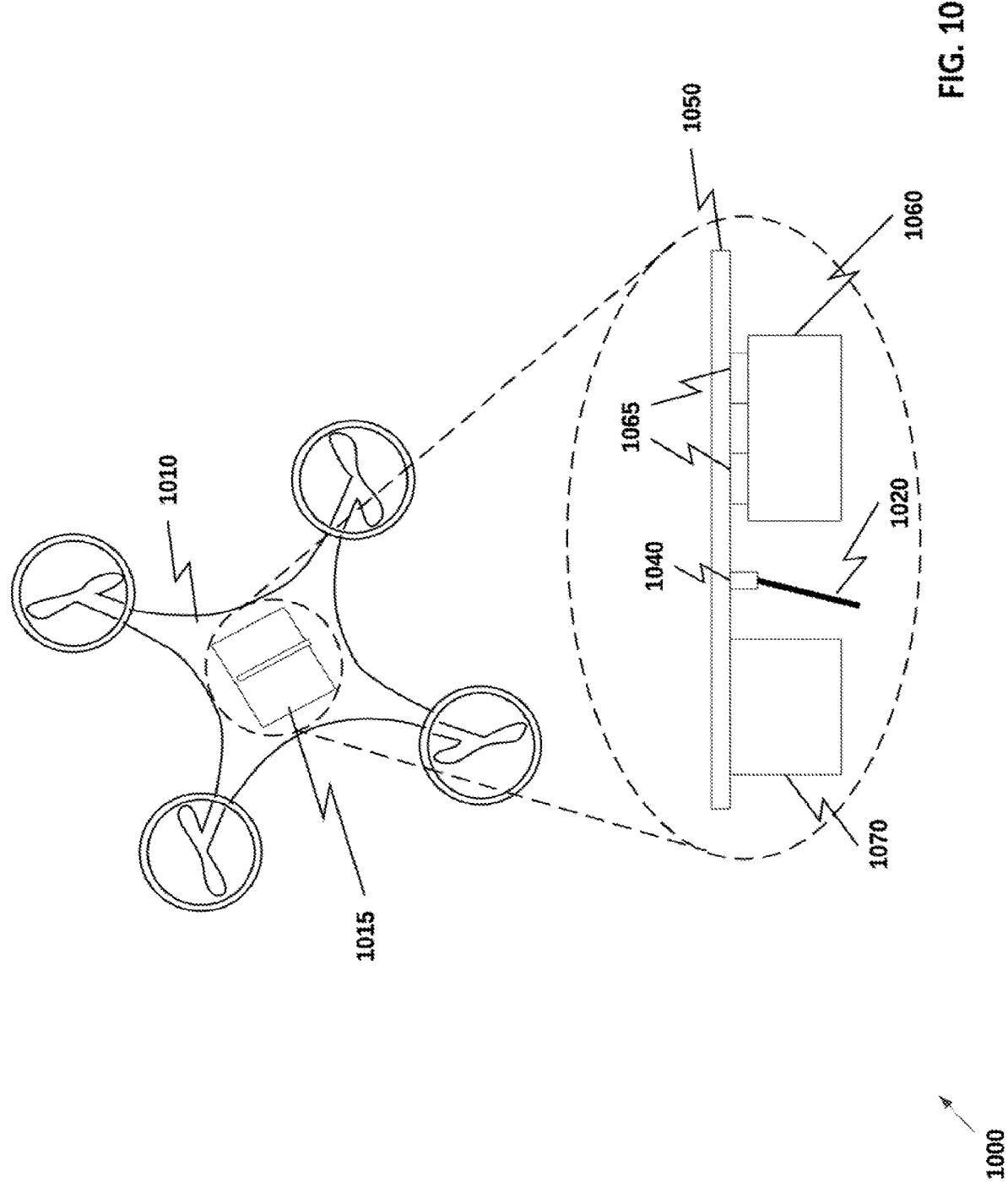
FIG. 10 illustrates an exemplary unmanned aerial system having quick-disconnect battery, consistent with disclosed embodiments.

FIG. 10 illustrates an exemplary unmanned aerial system 1000 having quick-disconnect battery according to some embodiments of the present disclosure. As shown in FIG. 10, for example, UAV 1010 comprises a maintenance bay 1015 for access to internal components. Maintenance bay 1015 can be located anywhere on the fuselage of UAV 1010. In some examples, maintenance bay 1015 is located on the underside of UAV 1010. Connectors for external components may be integrated into the bay doors or be located adjacent to the maintenance bay 1015.

In some embodiments, opening maintenance bay 1015 exposes carrier 1050. Carrier 1050 comprises connections for attaching at least one of a tether 1020 to tether attachment point 1040 and a battery 1060 to disconnect points 1065. Battery 1060 may have charging connectors, in the alternative or in addition to disconnect points 1065. Carrier 1050 may also include internal electronics 1070, as described above with respect to FIG. 5. Carrier 1050 may comprise interconnections to route power and data to and from internal electronics 1070 to tether 1020 and/or battery 1060.

In some embodiments, UAV 1010 may land on a landing platform and open maintenance bay 1015. UAS 1000 may then automatically charge and/or swap battery 1060, if present.

In some embodiments, the UAS comprising a UAV may be configured to carry one or more objects, people, and/or animals. Various UAVs described herein may be configured to produce an amount of lift sufficient to carry objects, people, and/or animals. A portable power source may be physically connected to a tether capable of transmitting power and data, which may in turn be connected to a UAV. In some embodiments, a portable power source may comprise one or more batteries or other components that acquire, store, and/or transmit power to a UAV. The portable power source may be a stand-alone device, and small enough to be transported in an automobile. The power source may be removed from a vehicle, activated, and connected to a UAV to power it for longer periods of time than a battery within the UAV itself.

In some embodiments, the UAV may include a connector that allows external components to attach to the UAV. A connector may be configured to allow a UAV to carry external components such as a objects, people, and/or robotic arms. External components may include large items used for a variety of purposes. For example, external components may include a rope, landscaping equipment, painting equipment, etc. External components may be used to carry a person, or perform tasks such as painting, landscaping, cleaning, lifting objects, people, and/or animals, etc.

Figure 11:
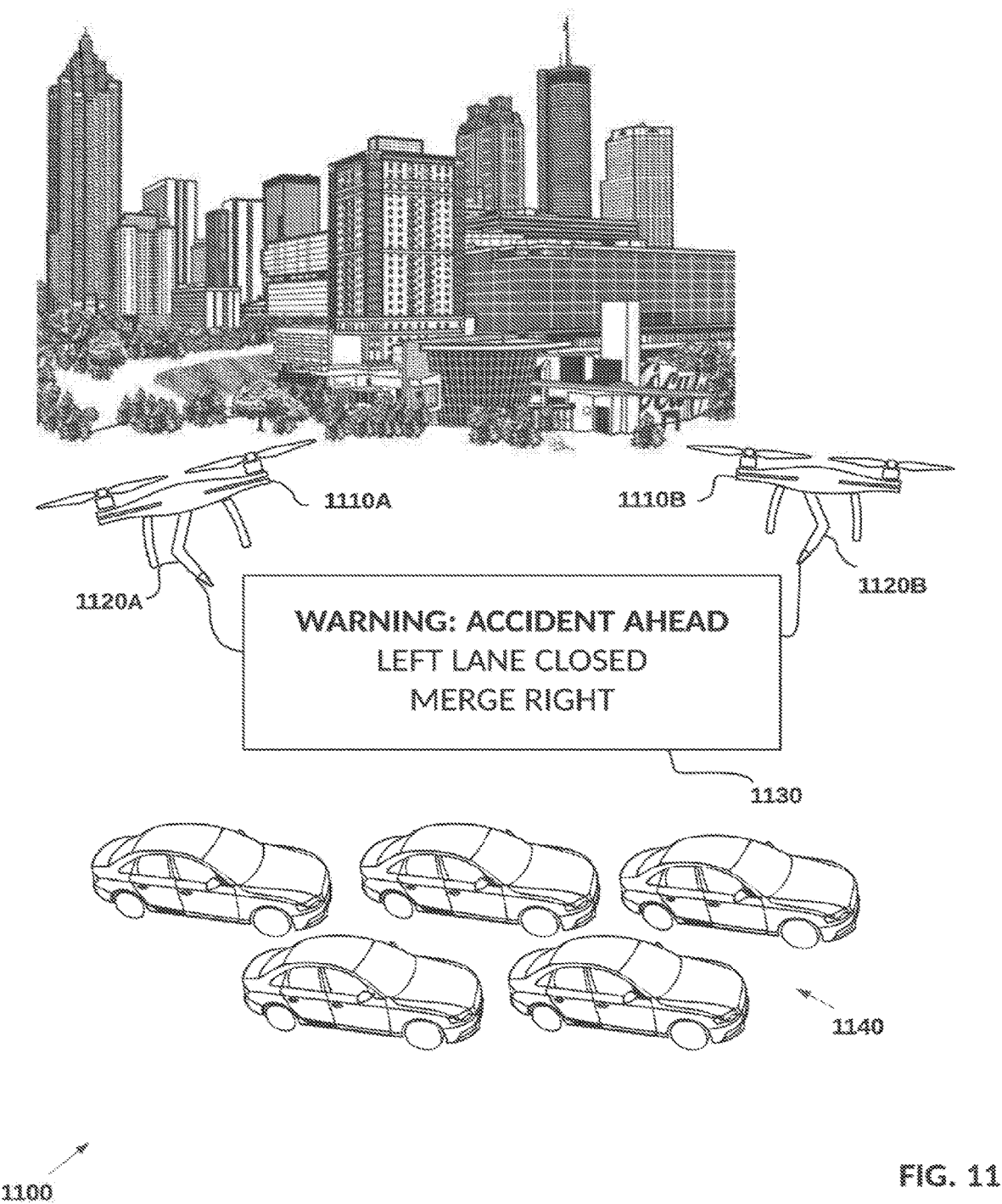
FIG. 11 illustrates an exemplary environment including an unmanned aerial vehicle and a traffic control message, consistent with disclosed embodiments.

FIG. 11 illustrates an exemplary environment 1100 including UAVs 1110A and 1110B and traffic control message 1130 according to some embodiments of the present disclosure. As shown in FIG. 11, for example, UAVs 1110A and 1110B have robotic arms 1120A and 1120B attached to connectors on the UAVs, respectively. Robotic arms 1120A and 1120B may hold cables connected to traffic control message 1130.

In some examples, traffic control message 1130 may warn drivers ahead of an accident, or notify drivers of a lane closure. For example, cars 1140 may be on a highway and UAVs 1110A and 1110B may fly above the highway with traffic control message 1130. Alternatively, the UAVs may fly throughout a city to provide traffic control messages 1130.

In some embodiments, an emergency event may occur away from a city or in a remote area. In this case, the UAVs may be powered by a portable power source. In some embodiments, the UAVs may be configured to fly from a predetermined area (e.g., the city) to the remote location to provide traffic control messages 1130.

Figure 12:
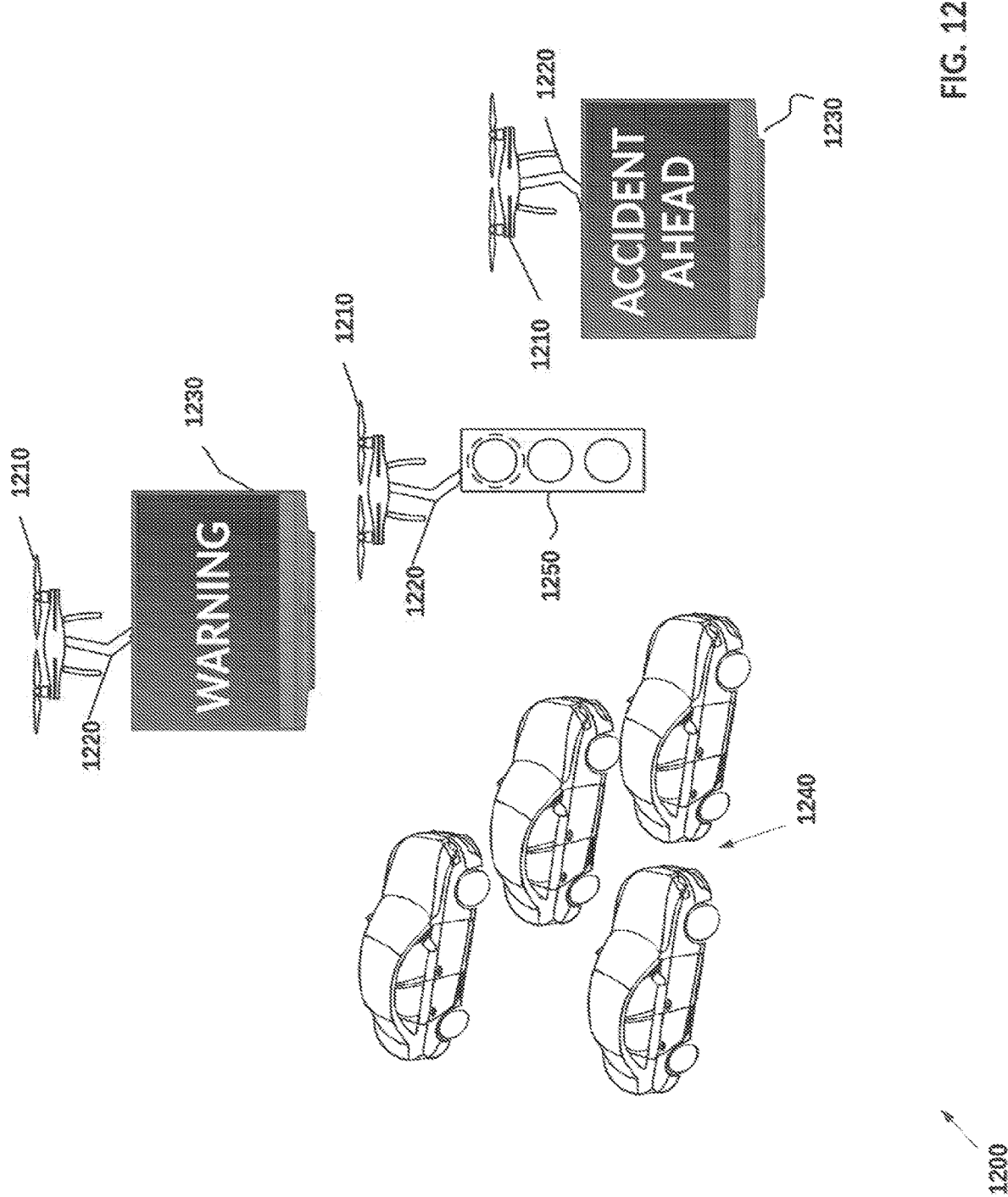
FIG. 12 illustrates an exemplary environment including unmanned aerial vehicles and display screens for traffic control, consistent with disclosed embodiments.

FIG. 12 illustrates an exemplary environment 1200 including UAVs 1210 and display screens 1230 for traffic control according to some embodiments of the present disclosure. As shown in FIG. 12, for example, UAVs 1210 have robotic arms 1220 attached to connectors on the UAVs, respectively. Robotic arms 1220 may hold display screens 1230.

In some embodiments, display screen 1230 may be held by robotic arm 1220. In other embodiments, display screen 1230 may be directly connected to UAV 1210 or may be connected by some other means.

In some embodiments, UAVs 1210 may carry the display screens 1230 and fly over a highway or other area to display a warning message. In some examples, display screens 1230 may be LED screens, LCD screens, plasma screens, rear projection screens, or any other self-contained display screen technology. In some embodiments, UAV 1210 may be connected to display screen 1230 through a connector and I/O port to transmit data to the display screen 1230. Display screen 1230 may receive the data and display a message according to the data. In some examples, UAV 1210 may have messages stored in memory and display the messages on the display screen 1230 when certain conditions occur. For example, UAV 1210 may also include a camera and use image recognition software to recognize events or vehicles 1240. When a certain event or vehicle 1240 is recognized, UAV 1210 may transmit data to the display screen 1230 to display a particular message (e.g., "warning, drive slowly") that is targeted to the particular person or vehicle 1240. In other embodiments, an operator may use a controller or other remote device to command UAV 1210 to display a certain message on display screen 1230.

In some embodiments, traffic signal 1250 may be held by robotic arm 1220. In other embodiments, traffic signal 1250 may be directly connected to UAV 1210 or may be connected by some other means. In some embodiments, UAVs 1210 may carry the traffic signal 1250 over a highway or other area to provide temporary traffic control in response to an emergency event. In some embodiments, UAV 1310 may be connected to traffic signal 1250 through a connector and I/O port to transmit data to the traffic signal 1250. In other embodiments, an operator may use a controller or other remote device to command UAV 1210 to display a certain signal on traffic signal 1250.

Figure 13:
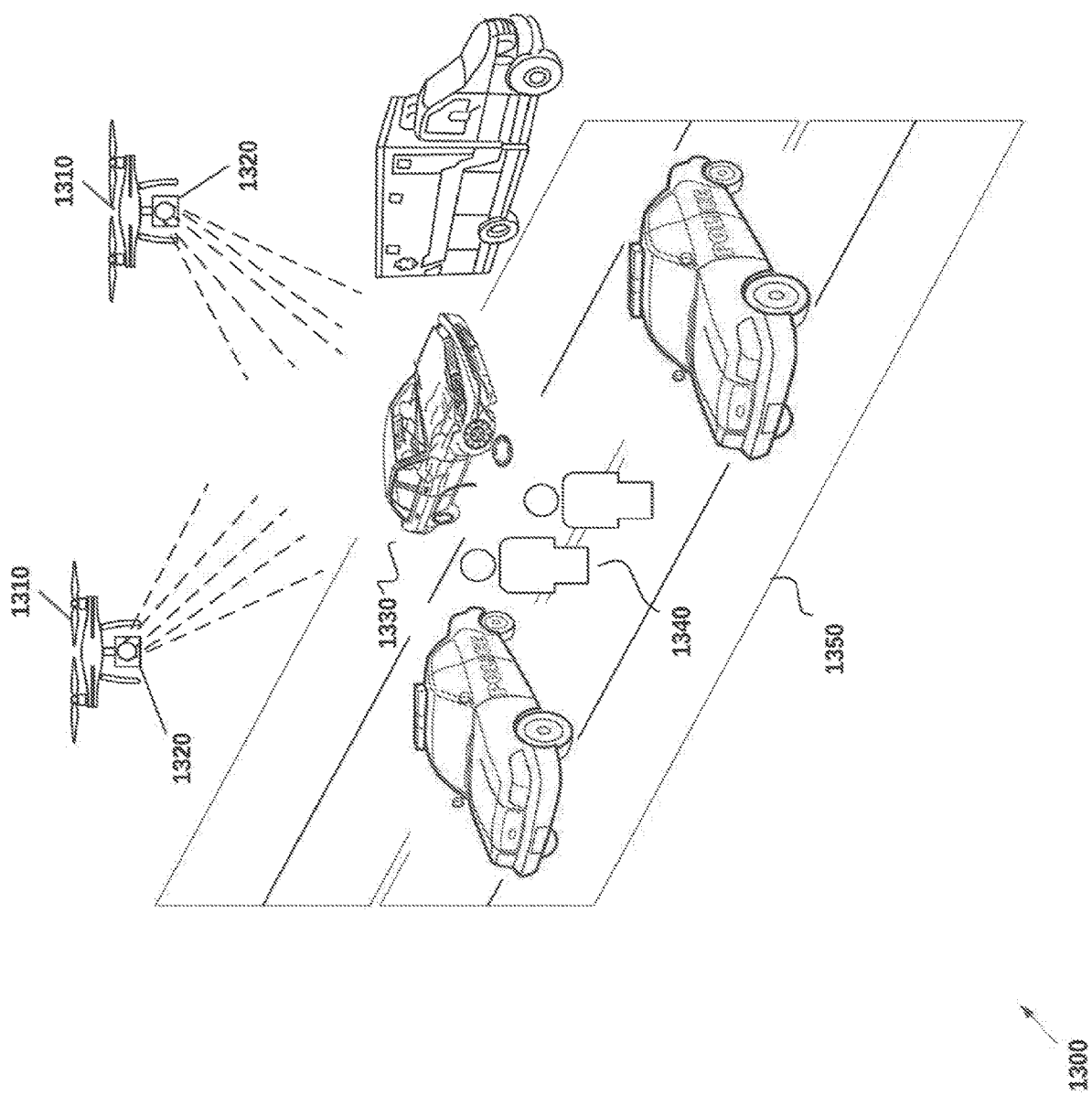
FIG. 13 illustrates an exemplary environment including unmanned aerial vehicles and light projectors, consistent with disclosed embodiments.

FIG. 13 illustrates an exemplary environment 1300 including UAVs 1310 and light projectors 1320 according to some embodiments of the present disclosure. As shown in FIG. 13, for example, UAVs 1310 are connected to light projectors 1320 and are configured to fly above an emergency event 1330.

In some embodiments, emergency event 1330 may be a traffic accident, or other event, and UAVs 1310 may be configured to shine spotlights on the location. In other embodiments, UAVs 1310 may be configured to use light projectors 1320 to provide additional lighting around the accident in order to assist emergency personnel 1440. For example, light projectors 1320 may have filters that create a projected image or message on a highway 1450 (e.g., "accident ahead, drive slow"). UAVs 1310 may position light projectors 1320 to display the image or message on highway 1350. In other embodiments, light projectors 1320 may be programmable. UAV 1310 may transmit data to and program light projector 1320 to display a preprogrammed message or image. In other embodiments, light projectors 1320 may be aimed towards the sky, allowing UAV 1310 to act as a beacon, notifying emergency personnel 1340 or other vehicles on highway 1350 of the location of emergency event 1330.

Figure 14:
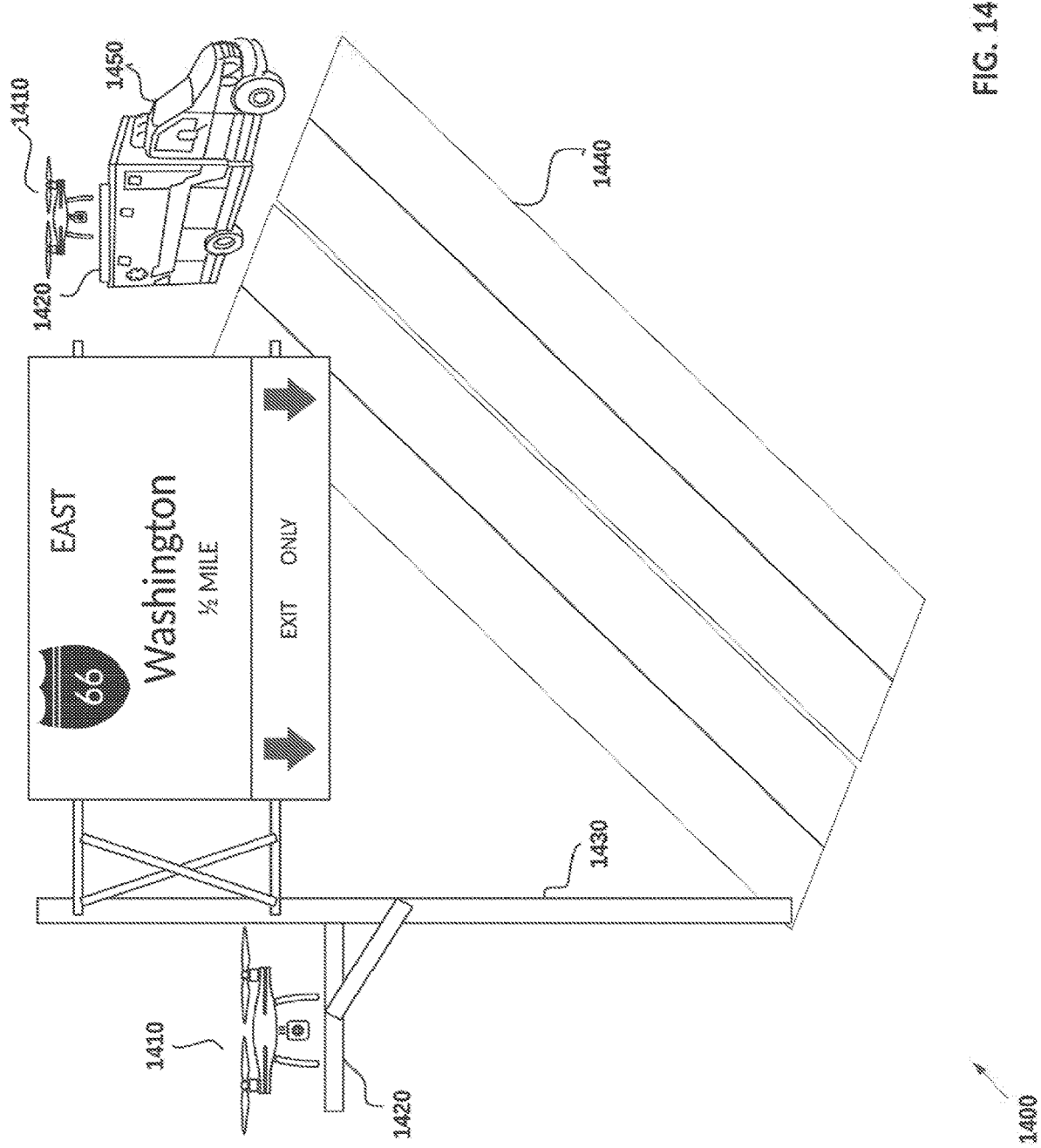
FIG. 14 illustrates an exemplary environment including an unmanned aerial vehicle and portable elevated platform, consistent with disclosed embodiments.

FIG. 14 illustrates an exemplary environment 1400 including one or more unmanned aerial vehicles 1410 and an elevated platform 1420 according to some embodiments of the present disclosure. As shown in FIG. 14, for example, UAV 1410 is sitting atop elevated platform 1420. In some embodiments, elevated platform 1420 may be permanently affixed to a structure such as traffic pole 1430. Traffic pole 1430 may include a supply of electricity. Elevated platform 1420 may be connected to the electricity source. In some examples, elevated platform 1420 may be attached to emergency response vehicle 1450. Emergency response vehicle 1450 may include a supply of electricity, and elevated platform 1420 may be connected to the electricity source. Elevated platform 1420 may then be used to power UAV 1410 by, for example, recharging internal UAV batteries, supplying power through a tether, maintaining charged batteries that can be swapped out with UAV 1410 internal batteries, etc.

In some examples, elevated platform 1420 may be portable. For example, an operator may temporarily affix the platform to a ridged structure for temporary use. Elevated platform 1420 may use a local power source or a portable power source as described above. In some examples, a portable elevated platform 1420 may be used to scan highway 1440 for an emergency event.

In some examples, UAV 1410 may be used to scan highway 1440. Highway 1440 may alternatively be a city road or other location. In the example, UAV 1410 may be tethered to elevated platform 1420 or use an internal power source. UAV 1410 may take off from elevated platform 1420 and fly around highway 1440 while recording video of highway 1440. UAV 1410 may transmit the video to an operator or monitoring station. In practice, UAS 1410 may replace or enhance pan-tilt-zoom cameras that are fixed and mounted on or around highway 1440. The mobility of UAV 1410 may enhance scanning an area that is not possible with fixed camera placements.

In some examples, UAV 1410 may remain airborne indefinitely by using a tether to elevated platform 1420. UAV 1410 may be designed to operate in most weather conditions, however, if UAV 1410 needed to land, for example, in an electrical storm, UAV 1410 may return to elevated platform 1420. In some examples, elevated platform 1420 may include a cover to protect UAV 1410 from damage.

In some embodiments, the platform (e.g., a landing area, hanger, other surface, etc.) may be included in the UAS. In some examples, the platform may house communications equipment that communicates with the UAV. For example, the platform may contain radiofrequency transmitters to communicate with the UAV wirelessly or through a tether.

Figure 15:
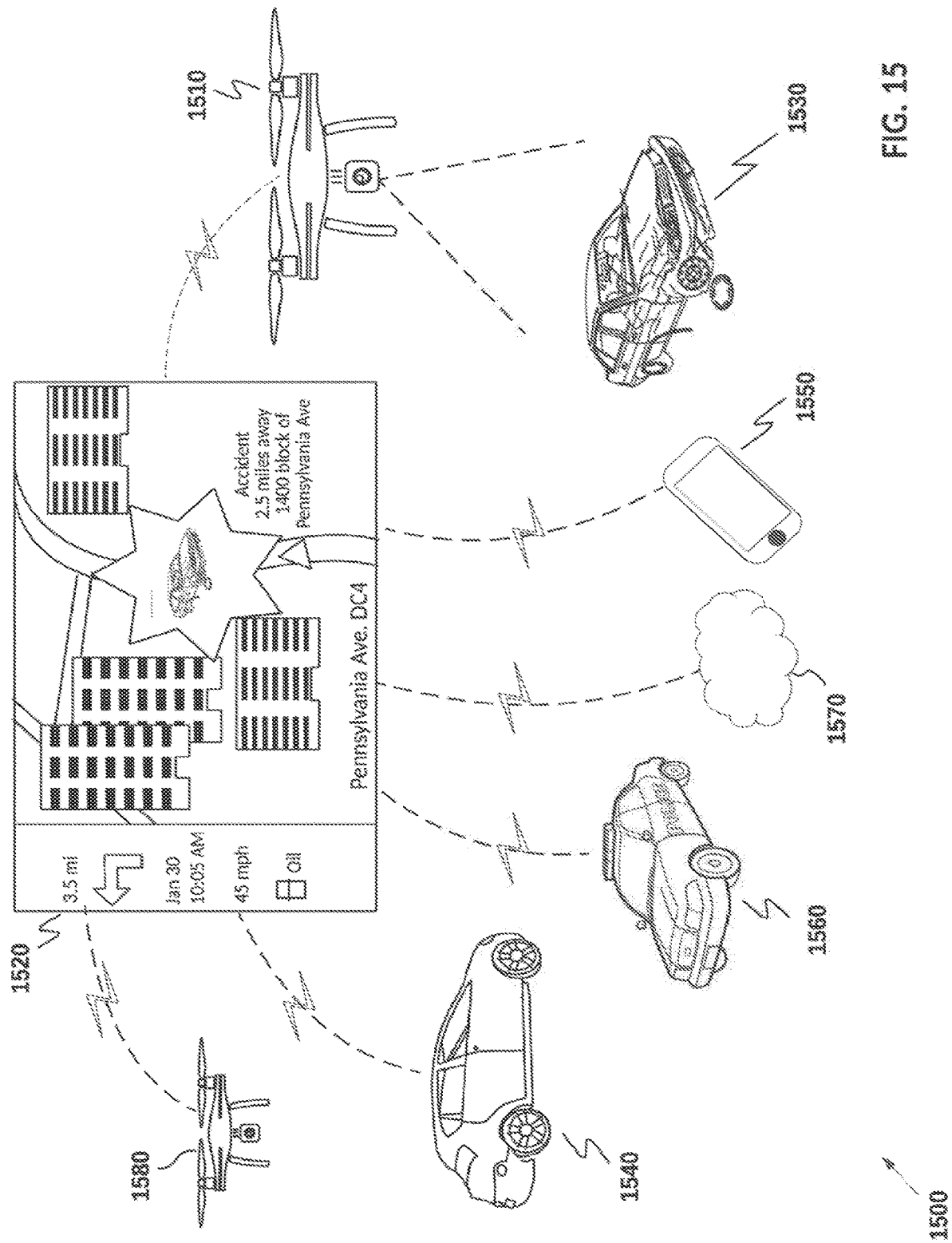
FIG. 15 illustrates an exemplary environment including an unmanned aerial vehicle and communication device, consistent with disclosed embodiments.

FIG. 15 illustrates an exemplary environment 1500 including an unmanned aerial vehicle 1510 and notification message 1520. In some examples, notification message 1520 may comprise data and/or data structures containing information relating to an emergency event 1530. In some embodiments, while navigating in an area, UAV 1510 may detect an emergency event 1530 through the use of an attached sensor or camera. For example, UAV 1510 may collect data or capture images of emergency event 1530, which may be a traffic accident. In some embodiments, UAV 1510 may also collect data or capture images from the area surrounding emergency event 1530. For example, UAV 1510 may determine any of the following: the location of emergency event 1530, the speed of nearby vehicles, and the time emergency event 1530 occurred. UAV 1510 may also detect the presence of any hazardous material surrounding emergency event 1530 (e.g., gas spill, oil spill, fire, toxic chemicals, etc.).

In some embodiments, UAV 1510 can use the collected data to create a notification message 1520. Notification message 1520 may then be communicated wirelessly to a plurality of other devices or systems. For example, notification message 1520 may be relayed to another UAV 1580, or a network of UAVs. In some embodiments, notification message 1520 is transmitted to another vehicle 1540, where it may be displayed on a screen already integrated within vehicle 1540. In other embodiments, notification message 1520 may also be transmitted to a cellular device 1550, police car 1560, or remote device 1570.

In some embodiments, a wireless communication device may be attached to vehicle 1540. In some examples, the wireless communication device may be connected to an OBDII (on-board diagnostics II) connector of the vehicle 1540. In other examples, the wireless communication device may be integrated in computing hardware in the vehicle 1540, such as an engine control unit (ECU), body control unit (BCU), or the like. The wireless communication device may further be integrated with a global positioning system (GPS). In some embodiments, the wireless communication device may receive notification message 1520, or other indication of emergency event 1530. In some examples, the wireless communication device may cause vehicle 1540 to change speed in response to the notification message 1520. In some embodiments, the wireless communication device receives data from emergency personnel (e.g., police 1560) or other devices (e.g., cellular device 1550 and/or remote device 1570).

In some embodiments, the wireless communication device may be attached to a vehicle involved in emergency event 1530. In some examples, the wireless communication device may receive data from an ECU or other sensors, and determine that an emergency situation has occurred. For example, the wireless communication device may receive data that the vehicle has rapidly decelerated and/or an airbag has deployed. The wireless communication device may transmit a notification message and/or data to other devices (e.g., vehicle 1540, police 1560, cellular device 1550, remote device 1570, and/or UAVs 1510 and 1580). In some examples, UAV 1510 may relay the notification message and/or data or modify the notification message and/or data with additional information from the UAV 1510 (e.g., images of the event, GPS coordinates, the presence of hazardous material, etc.).

In some embodiments, the wireless communication device may comprise one or more electronic modules configured to interface with an OBDII connector. The wireless communication device may receive data from the connector and send data through the connector. In other embodiments, the one or more electronic modules may also be configured to collect and transmit data to a cloud computing resource.

Figure 16:
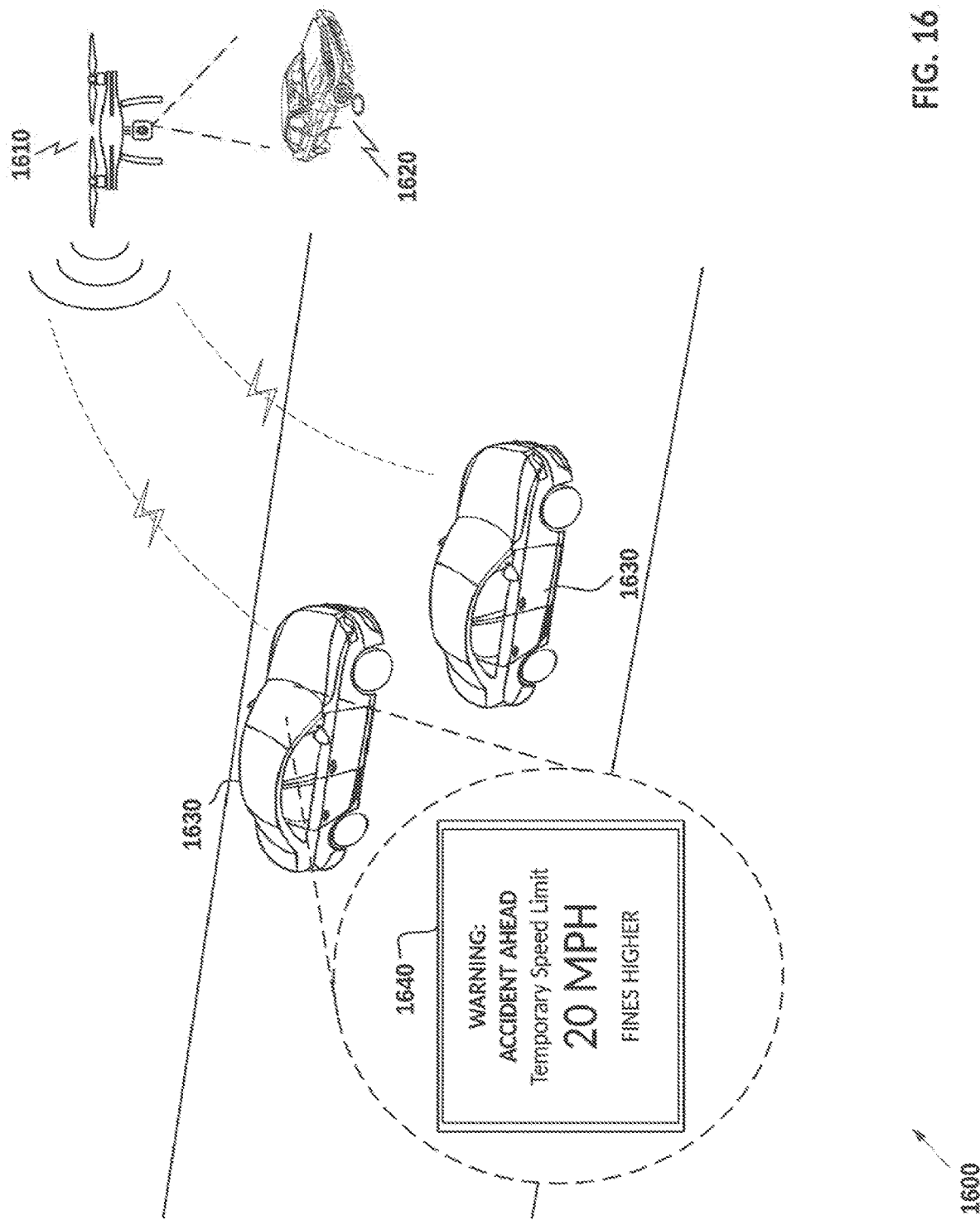
FIG. 16 illustrates an exemplary environment including an unmanned aerial vehicle and communication device, consistent with disclosed embodiments.

FIG. 16 illustrates an exemplary environment 1600 including an unmanned aerial vehicle 1610 and emergency event 1620. In some embodiments, UAV 1610 may detect emergency event 1620 using an attached sensor and/or camera. For example, the UAV 1610 may take an image of emergency event 1620 and process the image using machine vision algorithms to determine that an accident has occurred. In response to detecting the emergency event 1620, UAV 1610 may be configured to transmit a wireless signal to one or more vehicles 1630. In some embodiments, the signal may be sent autonomously by UAV 1610, or may be sent by an authorized operator of UAV 1610, for example, a police officer. The wireless signal may include a warning message 1640, which may be used to inform drivers of vehicles 1630 that an emergency event has occurred. In some embodiments, warning message 1640 may be displayed on a display system already present within vehicle 1630, for example, a display screen mounted in the dashboard, a GPS system, etc. In other embodiments, warning message 1640 may be transmitted to vehicle 1630 through a wireless module attached to vehicle 1630 through an on-board diagnostic port present within vehicle 1630. In some examples, the wireless signal transmitted by UAV 1610 may interact with control systems present within vehicle 1630 in order to limit the top maximum speed of vehicle 1630 in the area around emergency event 1620.

Figure 17:
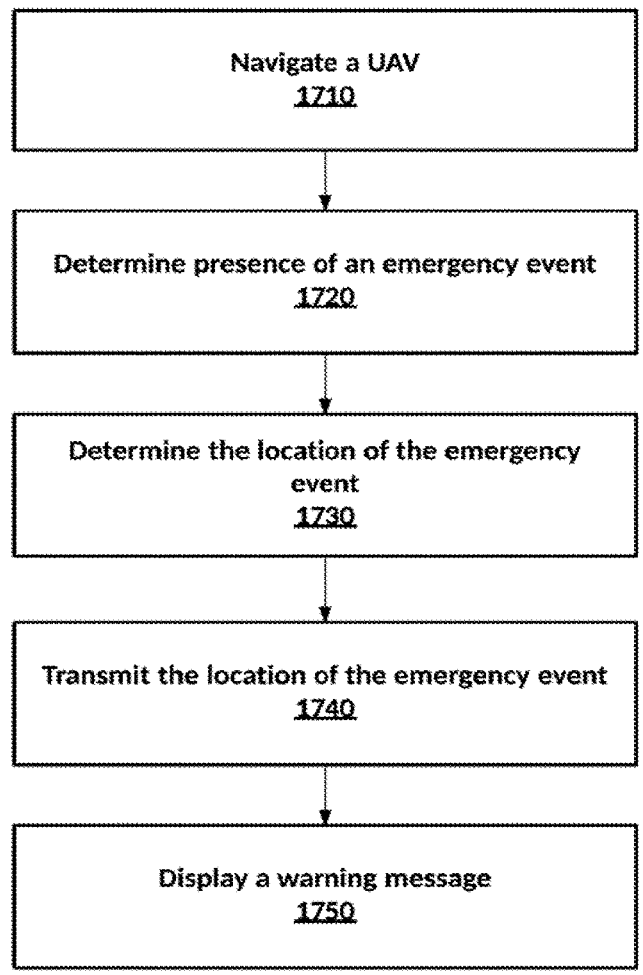
FIG. 17 shows a flowchart of a method of traffic control, consistent with disclosed embodiments.

FIG. 17 shows a flowchart of a method 1700 of traffic control, consistent with embodiments of the present disclosure. The method may be performed by, for example, the system shown in FIG. 5.

At step 1710, a UAV may navigate, for example to a predetermined area. The UAV may also fly autonomously within a bounded area. In some embodiments, the UAV may receive commands to navigate to an area. In other embodiments, the UAV may fly in a predetermined area without any input.

At step 1720, the UAV may determine is an emergency event has occurred. In some embodiments, the UAV may receive data from a remote device indicating that the emergency event has occurred. The UAV may navigate to the location of the event and confirm that the event has occurred. In some embodiments, the UAV may be equipped with a camera. The UAV may take pictures of an area and analyze the pictures using, for example, machine vision algorithms. The UAV may determine that an emergency event has occurred based on the analysis of the pictures.

At step 1730, the UAV may determine the location of the emergency event. In some embodiments, the UAV may be equipped with a global positioning system (GPS) device or another device that can determine the location of the UAV (e.g., a cellular network transceiver, Wi-Fi transceiver, etc.). Upon determining the presence of an emergency event, the UAV may determine its location using the GPS device. The UAV may also determine its distance to the emergency event, for example, using a range finder, analyzing images of the event, compass, etc. The exact location of the emergency event can then be calculated using the GPS coordinates and the distance to the event. Alternatively, the UAV may receive an indication of an emergency event from a wireless communication device located at or near the emergency event. The wireless communication device may transmit its location to the UAV in the event that an emergency event is detected. The UAV may used the transmitted location and determine the location of the emergency event.

At step 1740, the UAV may transmit the location of the emergency event. For example, the UAV may transmit the location to emergency services. The UAV may also determine the type of emergency event and transmit data indicating the type of emergency event along with the location of the event. In other embodiments, the UAV may transmit the location of the emergency event to a wireless communication device in nearby vehicles. The wireless communication device may be attached to an OBD connector and command the vehicle to slow as it approaches the location.

At step 1750, the UAV may display a warning message. For example, the UAV may display a message (e.g., on a display screen attached to the UAV) indicating the location of the emergency event. The UAV may also display the type of emergency event and precautions that should be taken to avoid the emergency event.

Figure 18:
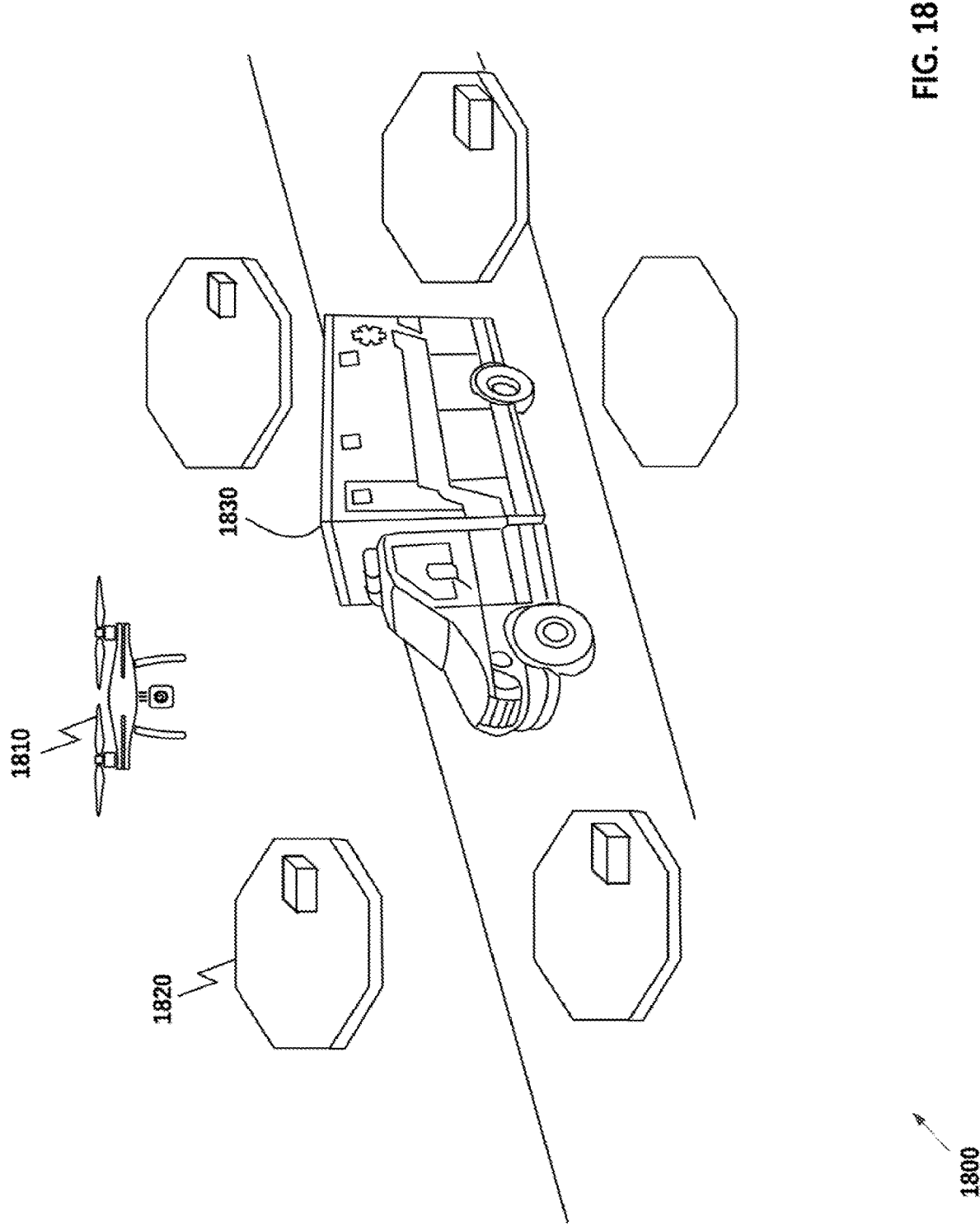
FIG. 18 illustrates an exemplary environment, including a UAV, a control center, landing pads, consistent with disclosed embodiments.

FIG. 18 illustrates an exemplary environment 1800 including a UAV 1810 and a control center 1830, according to some embodiments of the present disclosure. In some embodiments, the control center 1830 may be a truck, a building, or other place. In some examples, the control center 1830 may be an ambulance to accommodate injured people. The control center 1830 may carry equipment and other necessary materials for rescue activities.

As shown in FIG. 18, for example, a landing pad 1820 may be included. In some examples, the landing pad 1820 may be portable. For example, an operator may temporarily affix the landing pad 1820 to a ridged structure for temporary use. The landing pad 1820 may use a local power source or POE, as described above. In some examples, the landing pad 1820 may be used to house the UAV 1810 on a limited basis. While the UAV 1810 is sitting on the landing pad 1820, POE may be used to power the UAV 1810 and provide data to the UAV 1810.

In some embodiments, more than one landing pad 1820 may be used. For example, as shown in FIG. 18, other landing pads 1820 may also be established to accommodate multiple UAVs around the control center 1830.

In some embodiments, the UAV 1810 may be configured to receive data transmitted through a tether. The UAV 1810 may use commands sent through the tether to guide itself back to a platform. The data may include instructions navigating the UAV 1810 to a predetermined area or commanding the UAV 1810 to return to a platform.

In some embodiments, the landing pad 1820 (e.g., a landing area, hanger, other surface, etc.) may be included in the UAS. In some examples, the landing pad 1820 may house communications equipment that communicates with the UAV 1810. For example, the platform may contain radiofrequency transmitters to communicate with the UAV wirelessly or through the tether.

Figure 19:
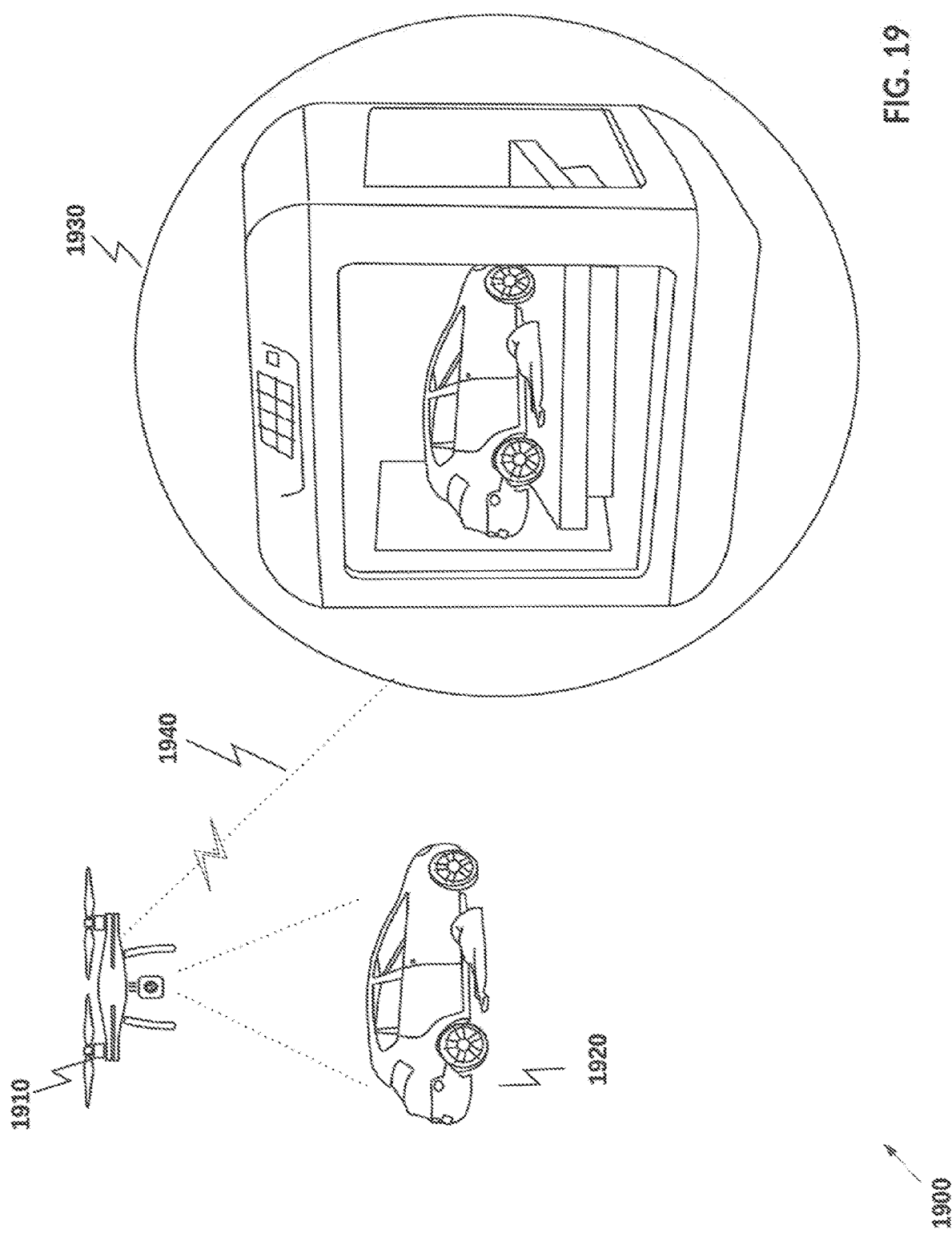
FIG. 19 illustrates an exemplary environment for scene reconstruction, consistent with disclosed embodiments.

FIG. 19 illustrates an exemplary environment 1900 for scene reconstruction system, according to disclosed embodiments. In some embodiments, a UAV 1910 may navigate to a predetermined area for investigation and take images (e.g., three-dimensional images) of the crime scene 1920 with a high resolution camera. In such embodiments, the data of the captured images may be transferred to a remote 3D printer 1930 (e.g., an additive manufacturing device) via wireless communication 1940 to create a three-dimensional reconstruction. Accurately reconstructing a crime scene as existed shortly after the incident may make a police investigation much more efficient and reliable because the UAV 1910 can be dispatched immediately after the incident to preserve vanishing proof of a crime at the scene.

Figure 20:
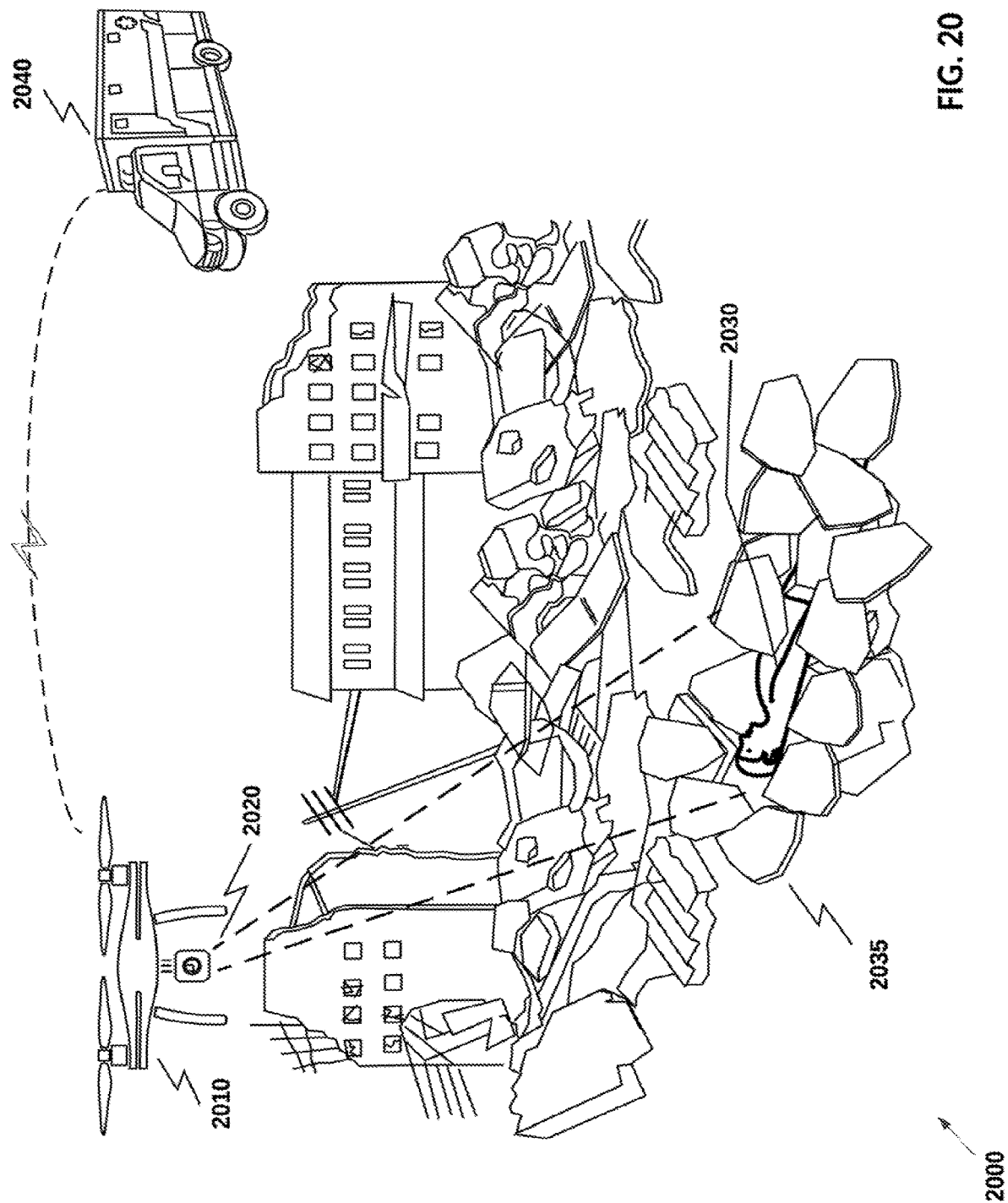
FIG. 20 illustrates an exemplary environment for finding a buried person, consistent with disclosed embodiments.

FIG. 20 illustrates an exemplary environment 2000 for finding a buried person, consistent with disclosed embodiments. In some embodiments, a UAV 2010 may navigate to a predetermined area to assess the condition of a disaster with a sensor 2020. The UAV 2010 may search for a person 2030 lying under the rubble 2035 using one or more sensors 2020 (e.g., a camera and machine-vision software). In such embodiments, the UAV 2010 may determine whether there is a person and whether the discovered person 2030 needs rescue. For example, an infrared system (e.g., IRDS, FLIR, or the like) may be used to detect a heat signature of the person 2030, even though the person is obscured from sight. In other examples, a ground-penetrating sensor may be used to detect the person 2030. The UAV 2010 may transmit gathered data to a control center 2040 via a communication interface. The control center 2040 may analyze the data and transmit a signal commanding the UAV 2010 to recover the person 2030. Even when ground access to a disaster-afflicted area is impossible, the UAV 2010 may provide prompt access to such area to achieve effective rescue activities because the UAV 2010 can scan the area and discover a trapped person under a torn building using one or more sensors.

Figure 21:
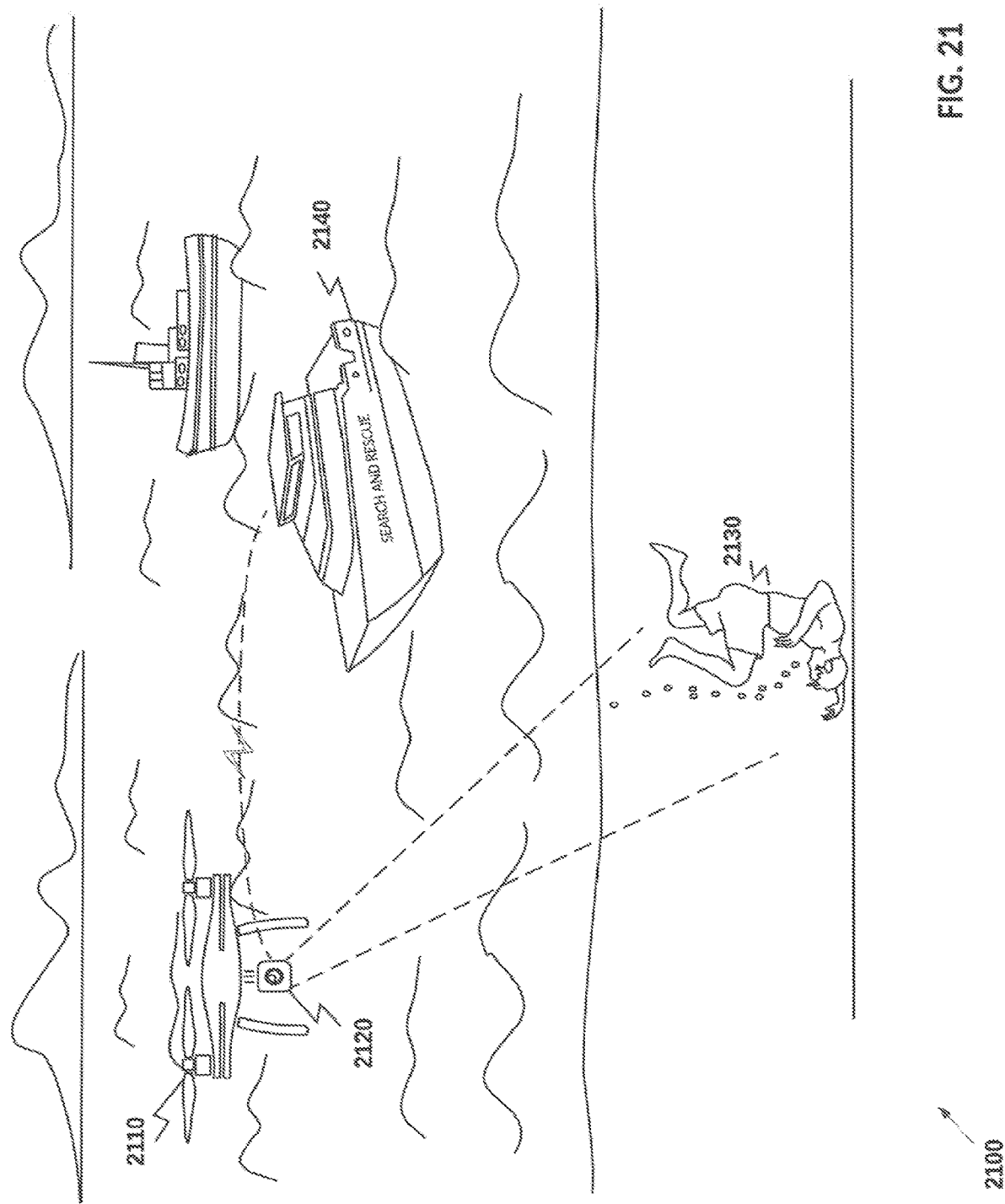
FIG. 21 illustrates an exemplary environment for searching for a submerged person, consistent with disclosed embodiments.

FIG. 21 illustrates an exemplary environment 2100 having a UAV 2110 for discovery and recovery of a drowning person 2130. In some embodiments, the UAV 2110 may navigate to a predetermined area to search for a drowning person 2130 with a water-penetrating sensor 2120. For example, an infrared system (e.g., IRDS, FLIR, and the like) may be used to determine a heat signature of the person 2130. In some cases, the person 2130 may be at the surface of the water, and in other cases, the person 2130 may be submerged. In such embodiments, the UAV 2110 may determine whether there is the person 2130 under the water and whether the person 2130 needs rescue. The UAV 2110 may transmit gathered data to the control center 2140 via a communication interface. The control center 2140 may analyze the data and transmit a signal commanding the UAV 2110 to recover the person 2130. Searching for a person in the sea may be complicated by factors such as visibility in the water and weather. The UAV may be used in such a task because the UAV can identify a drawn person from above using water-penetrating sensors.

Figure 22:
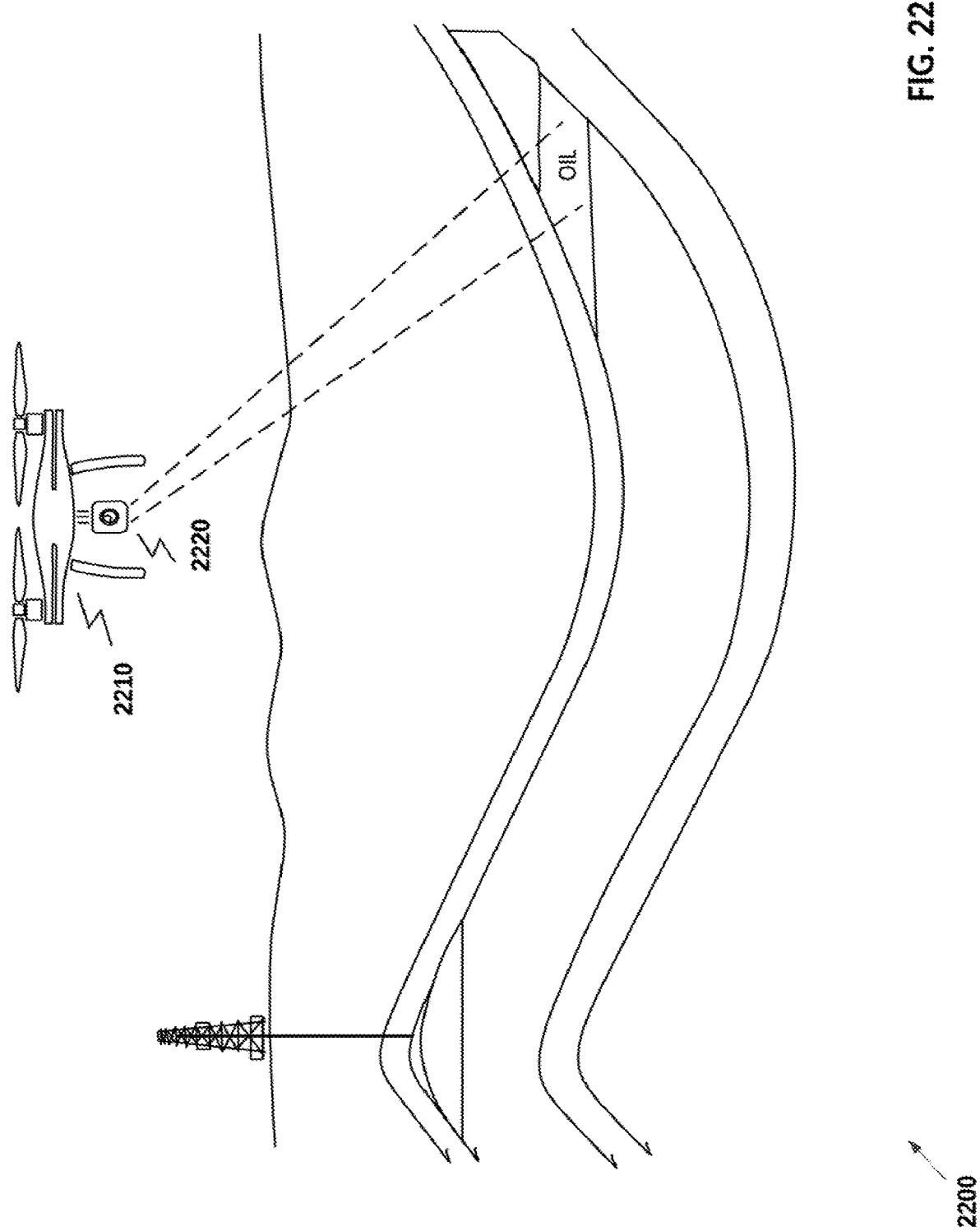
FIG. 22 illustrates an exemplary environment for exploring for natural resources, consistent with disclosed embodiments.

FIG. 22 illustrates an exemplary environment 2200 having a UAV 2210 for natural resource exploration. In some embodiments, the UAV 2210 may navigate to a predetermined area to search for a natural resource, such as oil. In such embodiments, the UAV 2210 may determine whether there is a natural resource and calculate the location of the natural resource using one or more sensors 2220. In some examples, the UAV 2210 may take a sample from a soil to check for the presence of a natural resource using a robotic arm. In other examples, the UAV 2210 may excavate using a robotic arm. Exploring a natural resource may become more efficient with the UAV 2210 because the UAV 2210 can cover a wide area in a more time-efficient manner. Use of the UAV 2210 may reduce costs of exploration by eliminating expensive exploration equipment.

Figure 23:
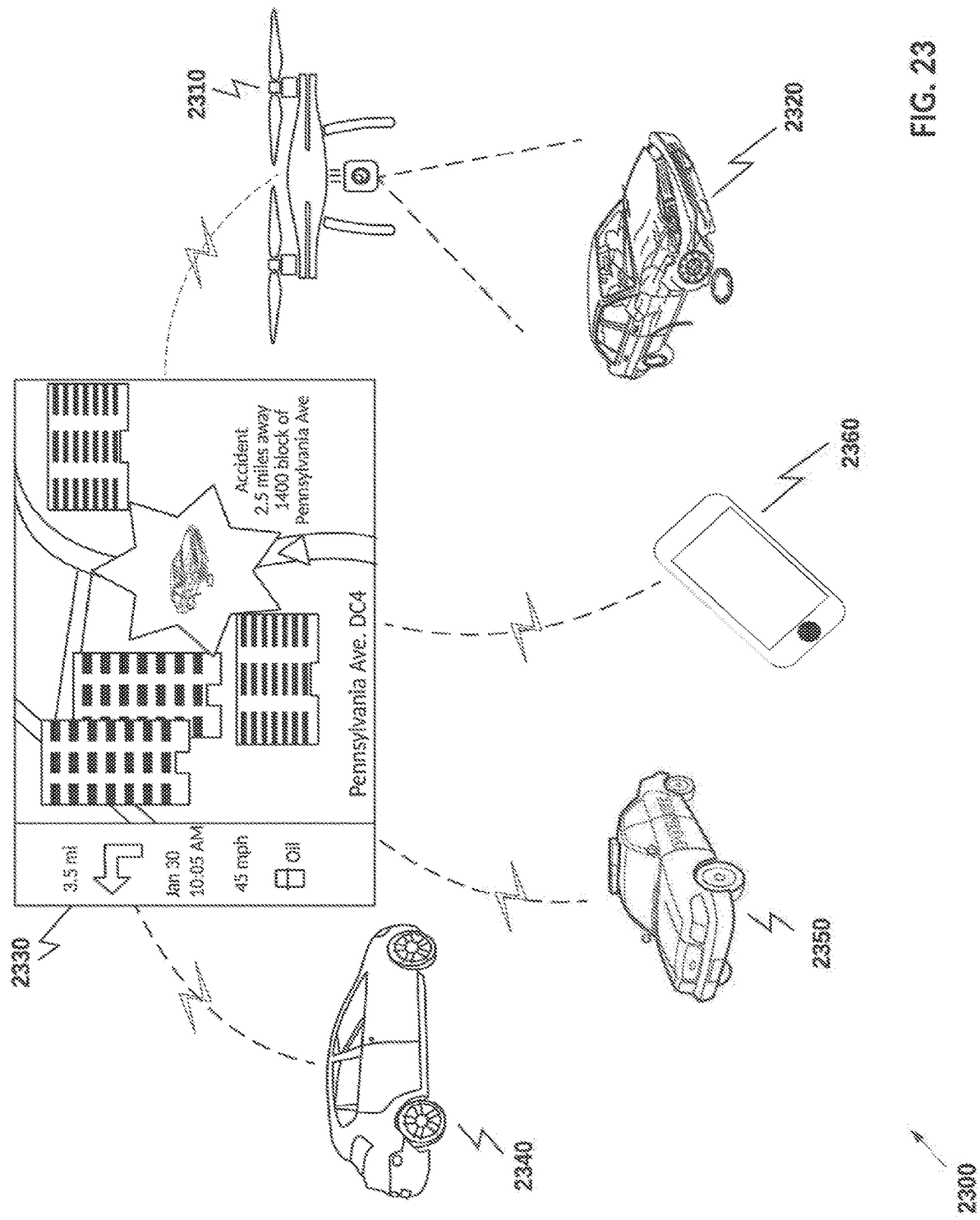
FIG. 23 illustrates an exemplary environment, having a UAV capturing data of an accident to transmit an alert to vehicles and a communication

FIG. 23 illustrates an exemplary environment 2300 using a UAV 2310 for emergency alert transmission. In some embodiments, the UAV 2310 may receive data indicating the occurrence of an emergency situation and fly to a predetermined area to collect data of the emergency situation. In other embodiments, the UAV 2310 may detect the presence of an emergency situation on its own using one or more sensors. In some examples, the UAV 2310 may determine whether there is an emergency situation. For example, in case of an immobilized car 2320 on a road, the UAV 2310 may obtain data using one or more sensors and determine the location and nature of the immobilized car 2320. The UAV 2310 may generate data for display on a vehicle navigation system 2330 to inform a user of the emergency situation. The UAV 2310 may transmit the data to notify a person in a vehicle 2340 of the emergency situation. As another example, the UAV 2310 may transmit an alert to the police

2350. In other embodiments, the UAV 2310 may transmit an alert to communication devices 2360. With use of the UAV 2310, emergency notification systems may become more effective and accurate because the UAV 2310 may gather data on the spot and provide an emergency alert for a display on the vehicle navigation system 2330.

Figure 24:
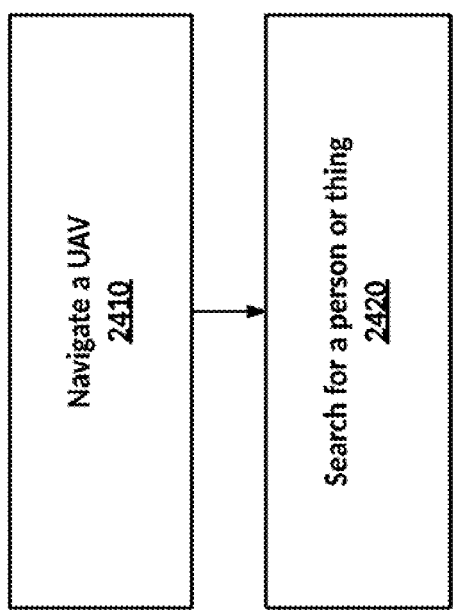
FIG. 24 is a flowchart showing a method of navigating a UAV and searching for a person or thing.

FIG. 24 is a flowchart showing a method 2400 of searching for a person or thing. For example, the method may be carried out by the UAS as shown in FIG. 20.

At step 2410, a UAV may navigate to an area. The area may be predetermined by a user or the UAV may determine that an area needs investigating.

At step 2420, the UAV may search for a person or thing. In some examples, the UAV may search for a buried victim. The UAV may use, for example, ground-penetrating sensors and/or infrared systems. In other examples, the UAV may search for minerals or other natural resources.

Figure 25:
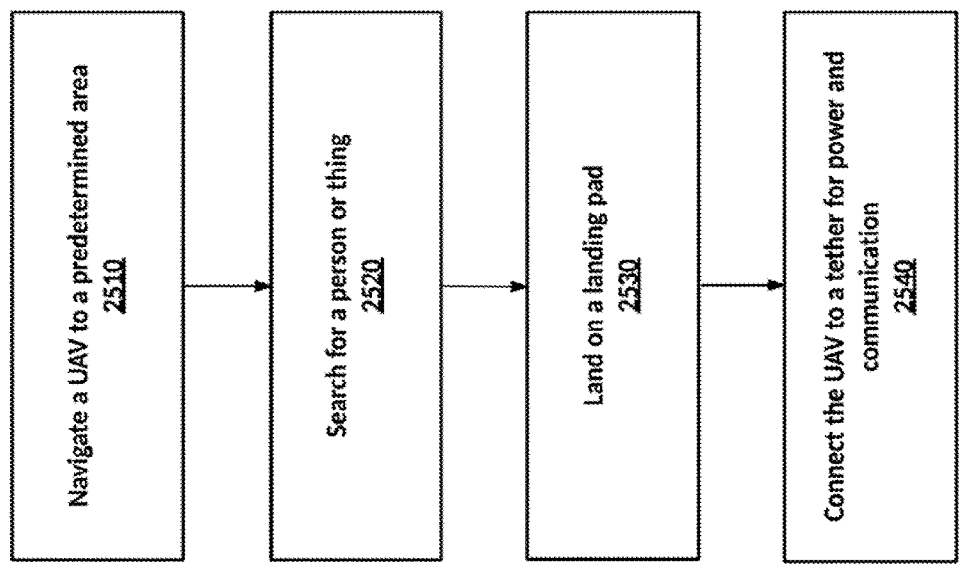
FIG. 25 is a flowchart showing a method of searching for a person or thing and connecting the UAV for power and communication.

FIG. 25 is a flowchart showing a method 2500 of providing data and power to an UAV. For example, the method may be carried out by the UAS shown in FIG. 2 and FIG. 6.

At step 2510, a UAV may navigate to a predetermined area. As one example, the UAV may be navigated by a remote control such as a mobile phone.

At step 2520, the UAV may search for a person or thing. In some examples, the UAV may use a camera and facial recognition software to scan an area to search for an injured victim. In other examples, the UAV may search for an immobilized car on a road. In still other examples, the UAV may use an infrared system to detect the heat signature of a person, for example, drowning in water or buried in rubble.

At step 2530, the UAV may land on a landing pad. The landing pad may be located in a control center. In some examples, the control center may be an ambulance or other emergency vehicle. The landing pad may also be located close to a traffic accident. In other examples, the control center may be a ship and have more than one landing pad.

At step 2540, the UAV may be connected to a portable power source via a tether. In some embodiments, the portable power source may transmit data and/or power to the UAV via the tether. As one example, the UAV may be connected to POE via the tether to receive data and power. In some embodiments, the portable power source and tether may be integrated into the landing pad.

Figure 26:
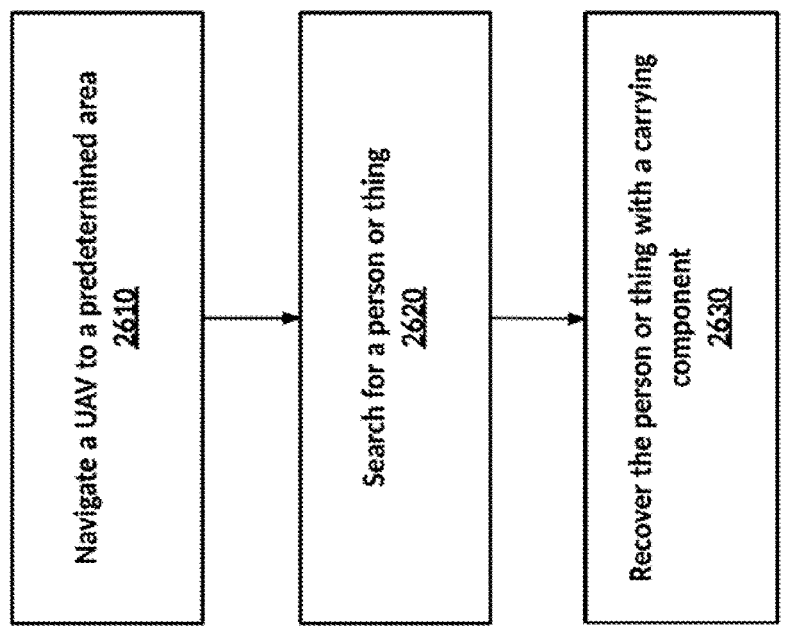
FIG. 26 is a flowchart showing a method of searching for and recovering a person or thing.

FIG. 26 is a flowchart showing method 2600 of recovery of a person or thing. For example, the method may be carried out by the UAS shown in FIG. 9.

At step 2610, a UAV may navigate to a predetermined area. In some embodiments, the UAV may receive a command ordering it to fly to the predetermined area from a control center.

At step 2620, the UAV may search for a person or thing. In some examples, the UAV may fly over water and search for a drowning person using an infrared camera. In other examples, the UAV may scan the ground and search for an injured person (e.g., using a ground penetrating sensor).

At step 2630, the UAV may recover the person or thing with a carrying component. In some examples, the UAV may have a robotic arm and a portable recovery container. The UAV may extend a scoop stretcher to the side of the injured person and scoop the person into the stretcher. The UAV may transport the injured person away from an accident scene using the scoop stretcher.

Figure 27:
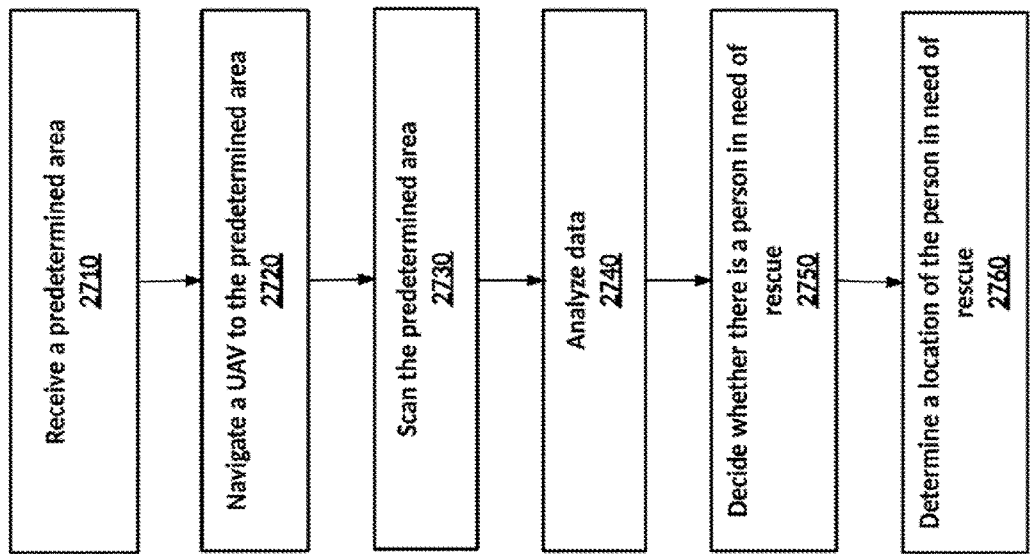
FIG. 27 is a flowchart showing a method of searching for a person in need of rescue.

FIG. 27 illustrates an exemplary method 2700 of rescuing a person by a UAV. For example, the method may be carried out by the UAS shown in FIG. 21.

At step 2710, the UAV may receive a predetermined area. In some examples, the predetermined area may be an area affected by a natural disaster.

At step 2720, the UAV may navigate to the predetermined area. In some examples, the UAV may be programmed with coordinates and fly autonomously to the coordinates, for example using a GPS.

At step 2730, the UAV may scan the predetermined area. The UAV may use one or more sensors to scan the area. For example, a ground-penetrating sensor may be used to scan beneath the surface of rubble or debris to locate a person. The UAV may also determine the condition of the ground and surrounding environment. In another example, the UAV may search for a person using a water-penetrating sensor or facial recognition software and one or more sensors.

At step 2740, the UAV may analyze data acquired from the one or more sensors while scanning. In some examples, the UAV may determine that the found person is immobilized, for example, based on the analysis that the person is not moving.

At step 2750, the UAV may decide whether there is a person in need of rescue. In some examples, the UAV may determine that the found person is injured based on acquired sensor data, for example, captured by a high-resolution camera. The data may indicate, for example, that the found person is not moving.

At step 2760, the UAV may determine a location of the person in need of rescue. In some examples, the UAV may pinpoint the location of the target (e.g., injured person) using a GPS or other coordinate determining device. Sensor data may also be obtained, for example, by a water-penetrating sensor. The UAV may measure the distance between the target and the UAV and use the GPS coordinates to determine the target's location.

Figure 28:
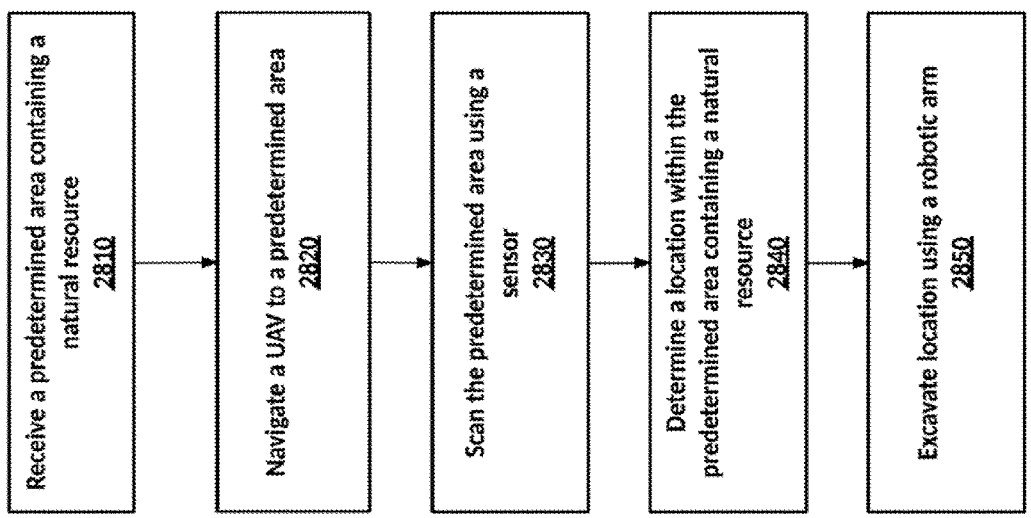
FIG. 28 is a flowchart showing a method of searching for a natural resource.

FIG. 28 is a flowchart showing method 2800 of searching for natural resources. For example, the method may be carried out by the UAS as shown in FIG. 22.

At step 2810, the UAV may receive a predetermined area containing a natural resource. At step 2820, the UAV may navigate to the predetermined area.

At step 2830, the UAV may scan the predetermined area using a sensor. In some examples, the UAV may use a ground-penetrating sensor to obtain data indicating structures beneath the surface of the ground. For example, ground penetrating radar may be used to determine a cavity underground that may contain a natural resource, such as oil.

At step 2840, the UAV may determine a location within the predetermined area containing a natural resource. In some examples, the UAV may gather data by scanning the ground with a ground-penetrating sensor and determine the location of the natural resource by analyzing the data.

At step 2850, the UAV may excavate the location using a robotic arm. In some examples, the UAV may use drills attached to a robotic arm to excavate the ground.

Figure 29:
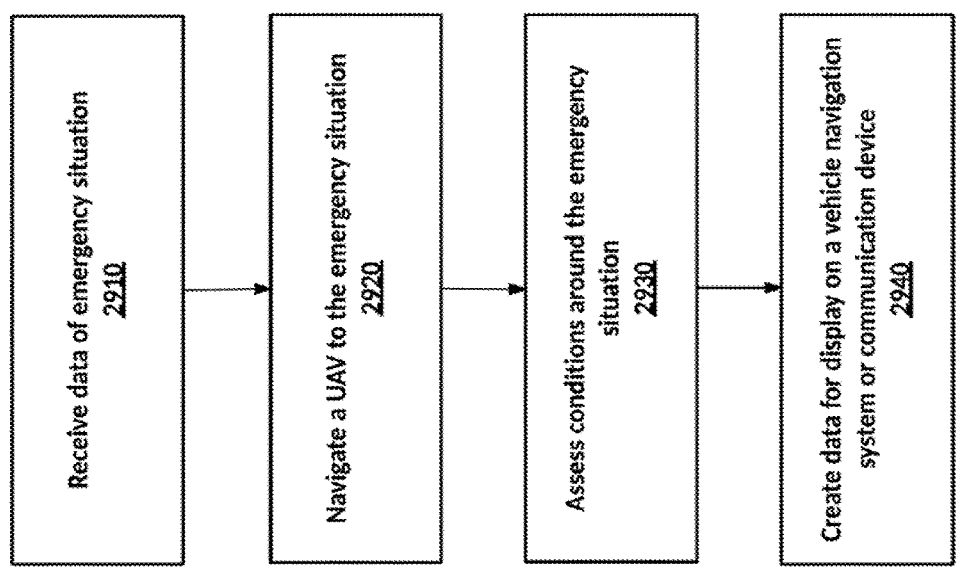
FIG. 29 is a flowchart showing a method of collecting data of an emergency situation and creating data for display on a vehicle navigation system or communication device.

FIG. 29 is a flowchart showing a method 2900 of collecting data of an emergency situation and creating data for display on a vehicle navigation system or communication device. For example, the method may be carried out by the UAS as shown in FIG. 23.

At step 2910, the UAV may receive data of an emergency situation. The data may comprise GPS coordinates and a categorization of the emergency situation. For example, the emergency situation may be an immobilized car on a road, and the data may indicate the location and type of car.

At step 2920, the UAV may navigate to the emergency situation. In some examples, the UAV may navigate to a scene of a traffic accident immediately after police receive an emergency call.

At step 2930, the UAV may assess conditions around the emergency situation. In some examples, the UAV may take pictures of the scene of a traffic accident and send data to a control center for determination of existence of emergency situation. In other examples, the UAV may analyze the pictures and use machine vision algorithms to determine the existence of the emergency situation. In other examples, the UAV may determine that the road is blocked by an immobilized car by analyzing traffic flow data. The UAV may also determine the extent of the accident by counting the number of cars that are not moving around the accident.

At step 2940, the UAV may create data for display on a vehicle navigation system or communication device. In some examples, the UAV may collect data including a location and nature of the emergency situation using one or more sensors to create data visualizing the condition of the emergency situation. Such data may be reformatted for display on a vehicle navigation system to alert a driver of presence of the emergency situation (e.g., an immobilized car on a road). In other examples, the UAV may create data for display on a mobile phone. In other examples, the UAV may create data indicating the location and nature of the emergency situation and transmit the data to a communication device in approaching vehicles. The communication device may interpret the data and cause the vehicle to slow as it approaches the emergency situation.

Figure 30:
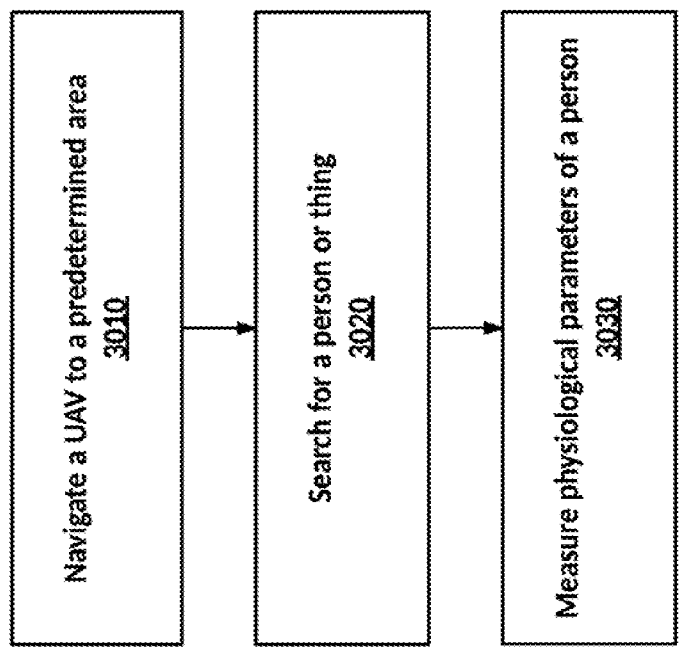
FIG. 30 is a flowchart showing a method of measuring physiological parameters of a person.

FIG. 30 is a flowchart showing method 2300 of measuring physiological parameters of a person. For example, the method can be carried out as the UAS shown in FIG. 9.

At step 3010, the UAV may navigate to a predetermined area. In some examples, the UAV may navigate to a disaster-stricken area.

At step 3020, the UAV may search for a person or thing. In some examples, the UAV may use facial recognition software and a camera to search for a stranded person.

At step 3030, the UAV may measure physiological parameters of the person. For example, a robotic arm may be used to apply sensors to the person and the sensors may transmit data indicating physiological parameters back to the UAV. In some examples, the UAV may be equipped with thermometer, an O2 monitor, or the like, so that it can measure physiological parameters, such as oxygenation saturation, blood pressure, body temperature, and/or heart rate of the person.

The technologies described herein have many advantages in the field of unmanned aerial vehicles. For example, prolonged inspection of power lines in remote locations may be provided. UAVs may also quickly assess damage to and repair power lines without the need for intervention.

Aspects of the embodiments and any of the methods described herein can be performed by computer-executable instructions stored in one or more computer-readable media (storage or other tangible media) or stored in one or more compute readable storage devices, as described herein. The computer-executable instructions can be organized into one or more computer-executable components or modules. Aspects of the embodiments can be implemented with any number and organization of such components or modules. For example, aspects of the disclosed embodiments are not limited to the specific computer-executable instructions or the specific components or modules illustrated in the figures and described herein. Other embodiments may include different computer-executable instructions or components having more or less functionality than illustrated and described herein.

The order of execution or performance of the operations in the disclosed embodiments illustrated and described herein is not essential, unless otherwise specified. That is, the operations can be performed in any order, unless otherwise specified, and embodiments can include additional or fewer operations than those disclosed herein. For example, it is contemplated that executing or performing a particular operation before, contemporaneously with, or after another operation is within the scope of aspects of the disclosed embodiments.

Having described the disclosed embodiments in detail, it will be apparent that modifications and variations are possible without departing from the scope of aspects as defined in the appended claims. For instance, elements of the illustrated embodiments may be implemented in software and/or hardware. In addition, the technologies from any embodiment or example can be combined with the technologies described in any one or more of the other embodiments or examples. In view of the many possible embodiments to which the principles of the disclosed technology may be applied, it should be recognized that the illustrated embodiments are examples of the disclosed technology and should not be taken as a limitation on the scope of the disclosed technology. Therefore, it is intended that all matter contained in the above description and shown in the accompanying drawings shall be interpreted as illustrative and not in a limiting sense.

The invention claimed is:

1. An unmanned aerial system (UAS), comprising:
   an unmanned aerial vehicle (UAV);
   at least one sensor, the UAV being configured to receive data from the at least one sensor;
   at least one processor; and
   a memory including instructions that, when executed, cause the at least one processor to:
   navigate the UAV to an area;
   determine a location of the UAV using a Global Positioning System (GPS) device;
   scan the area using the at least one sensor;
   capture data from the at least one sensor during the scanning;
   analyze the captured data;
   determine, based on the analyzed data, whether an emergency event has occurred;
   determine a distance between the UAV and a location of the emergency event;
   calculate the location of the emergency event using the determined location of the UAV and the determined distance; and
   in response to determining the occurrence of the emergency event, transmit an alert to a remote device, the alert indicating a location of at least one of the UAV or the calculated location of the emergency event.

2. The UAS of claim 1, wherein the UAV comprises at least one connector configured to attach to one of a plurality of different external components.

3. The UAS of claim 1, wherein the at least one sensor comprises at least one of a camera, an electrical conductivity sensor, an electrical current sensor, an oxygen sensor, a cardon dioxide sensor, a carbon monoxide sensor, a particulate sensor, a motion sensor, or a microphone.

4. The UAS of claim 1, wherein the at least one sensor is a ground-penetrating or water-penetrating sensor.

5. The UAS of claim 1, wherein the at least one sensor comprises a camera configured to use infrared light to detect a heat signature.

6. The UAS of claim 5, wherein the heat signature is associated with a person at least partially obscured from the UAV by debris or water.

7. The UAS of claim 1, wherein the UAV is configured to wirelessly communicate with a landing platform.

8. The UAS of claim 1, wherein:
the instructions further cause the at least one processor to determine a location of the UAV using a Global Positioning System (GPS) device; and
the alert indicates the location of the UAV determined using the GPS device.

9. The UAS of claim 1, wherein the distance between the UAV and a location of the emergency event is determined using at least one of a range finder, a compass, or analyzing an image captured by the UAV.

10. The UAS of claim 1, wherein the instructions further cause the at least one processor to determine, based on the analyzed data, that an individual associated with the emergency event is not moving.

11. The UAS of claim 1, wherein the UAV is configured to automatically land in response to an adverse weather condition.

12. The UAS of claim 1, wherein the alert further indicates a speed of a vehicle.

13. The UAS of claim 1, wherein the alert further indicates a time that the emergency event occurred.

14. The UAS of claim 1, wherein the remote device is attached to a vehicle.

15. The UAS of claim 1, wherein the remote device is associated with an emergency vehicle.

16. The UAS of claim 1, wherein:
the at least one sensor comprises a camera;
the captured data comprises at least one image captured by the camera; and
analyzing the captured data comprises analyzing the at least one image using a machine vision algorithm to determine the occurrence of the emergency event.

17. The UAS of claim 1, wherein the alert is configured for display at a screen integrated into a vehicle.

18. A method of emergency situation alert by an unmanned aerial vehicle (UAV) comprising at least one sensor, the method comprising:
navigating the UAV to an area;
determining a location of the UAV using a Global Positioning System (GPS) device;
scanning the area using the at least one sensor;
capturing data from the at least one sensor during the scanning;
analyzing the captured data;
determining, based on the analyzed data, whether an emergency event has occurred;
determining a distance between the UAV and a location of the emergency event;
calculating the location of the emergency event using the determined location of the UAV and the determined distance; and
in response to determining the occurrence of the emergency event, transmitting an alert to a remote device, the alert indicating a location of at least one of the UAV or the calculated location of the emergency event.

19. A non-transitory computer-readable medium comprising instructions for emergency situation alert by an unmanned aerial vehicle (UAV), the UAV comprising at least one sensor, wherein the instructions are executable by at least one processor to cause the at least one processor to:
navigate the UAV to an area;
determine a location of the UAV using a Global Positioning System (GPS) device;
scan the area using the at least one sensor;
capture data from the at least one sensor during the scanning;
analyze the captured data;
determine, based on the analyzed data, whether an emergency event has occurred;
determine a distance between the UAV and a location of the emergency event;
calculate the location of the emergency event using the determined location of the UAV and the determined distance; and
in response to determining the occurrence of the emergency event, transmit an alert to a remote device, the alert indicating a location of at least one of the UAV or the calculated location of the emergency event.

* * * * *